US 12,441,001 B2

(12) United States Patent
Mizohata et al.

(10) Patent No.: US 12,441,001 B2
(45) Date of Patent: Oct. 14, 2025

(54) ROBOTIC SURGICAL SYSTEM AND METHOD FOR CONTROLLING ROBOTIC SURGICAL SYSTEM

(71) Applicant: KAWASAKI JUKOGYO KABUSHIKI KAISHA, Kobe (JP)

(72) Inventors: Yuichi Mizohata, Kobe (JP); Ayataka Kobayashi, Kobe (JP); Takaki Morimoto, Yokohama (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 124 days.

(21) Appl. No.: 18/392,568

(22) Filed: Dec. 21, 2023

(65) Prior Publication Data

US 2024/0217115 A1    Jul. 4, 2024

(30) Foreign Application Priority Data

Dec. 28, 2022    (JP) ................. 2022-211532

(51) Int. Cl.
| | |
|---|---|
| *B25J 13/06* | (2006.01) |
| *A61B 34/00* | (2016.01) |
| *A61B 34/30* | (2016.01) |
| *A61B 34/37* | (2016.01) |
| *A61B 90/00* | (2016.01) |

(52) U.S. Cl.
CPC .............. *B25J 13/06* (2013.01); *A61B 34/25* (2016.02); *A61B 34/37* (2016.02); *A61B 90/37* (2016.02); *A61B 2034/301* (2016.02)

(58) Field of Classification Search
CPC .......... B25J 13/06; A61B 34/25; A61B 34/37; A61B 90/37; A61B 2034/301; A61B 50/13; A61B 90/361; A61B 34/74; A61B 2034/742; A61B 34/70; A61B 46/10; A61B 2034/302; A61B 2090/364; A61B 34/30

See application file for complete search history.

(56) References Cited

U.S. PATENT DOCUMENTS

| | | | | |
|---|---|---|---|---|
| 5,251,127 A | * | 10/1993 | Raab ..................... | A61B 90/10 606/130 |
| 6,187,018 B1 | * | 2/2001 | Sanjay-Gopal ........ | A61B 90/36 604/116 |
| 6,675,040 B1 | * | 1/2004 | Cosman ................. | A61B 90/10 606/130 |
| 6,851,855 B2 | * | 2/2005 | Mitschke ............... | A61B 6/547 378/207 |
| 6,859,661 B2 | * | 2/2005 | Tuke ...................... | A61B 90/36 606/130 |
| 7,594,933 B2 | * | 9/2009 | Kammerzell .......... | A61B 34/20 623/22.15 |
| 7,660,623 B2 | * | 2/2010 | Hunter ............... | A61B 17/1703 345/418 |

(Continued)

FOREIGN PATENT DOCUMENTS

JP    2018-94446 A    6/2018

*Primary Examiner* — Bhavesh V Amin
(74) *Attorney, Agent, or Firm* — METROLEX IP LAW GROUP, PLLC; Robert L. Scott, Esq.

(57) ABSTRACT

This robotic surgical system has a controller that performs the process of displaying, on the display, a graphical user interface overlayed on the image captured by the endoscope, wherein the graphical user interface includes a correctable range indication indicating a pivot correctable range that is set based on the pivot position stored in the storage.

20 Claims, 19 Drawing Sheets

(56) References Cited

U.S. PATENT DOCUMENTS

| | | | | |
|---|---|---|---|---|
| 8,548,779 | B2* | 10/2013 | Ortmaier | A61B 34/20 703/7 |
| 8,890,511 | B2* | 11/2014 | Belew | A61B 17/3403 324/207.13 |
| 8,990,052 | B2* | 3/2015 | Lavallee | G16H 50/50 703/1 |
| 9,248,001 | B2* | 2/2016 | Colombet | A61B 17/1764 |
| 9,314,188 | B2* | 4/2016 | Hladio | A61B 5/1072 |
| 9,480,534 | B2* | 11/2016 | Bowling | A61B 34/74 |
| 11,166,781 | B2* | 11/2021 | Otto | A61B 90/37 |
| 11,864,957 | B2* | 1/2024 | Otto | A61B 90/361 |
| 2006/0241405 | A1* | 10/2006 | Leitner | A61B 17/1764 600/407 |
| 2009/0012532 | A1* | 1/2009 | Quaid | A61B 17/1764 128/898 |
| 2014/0276886 | A1* | 9/2014 | Stein | A61B 5/1121 606/102 |
| 2015/0133945 | A1* | 5/2015 | Dushyant | A61B 90/39 606/102 |
| 2015/0185846 | A1* | 7/2015 | Otto | G06T 7/13 |
| 2016/0242858 | A1* | 8/2016 | Moctezuma de la Barrera | A61B 34/20 |
| 2017/0172697 | A1* | 6/2017 | Aghazadeh | A61F 2/4657 |
| 2017/0224422 | A1* | 8/2017 | Bakirtzian | A61F 2/4607 |
| 2017/0245946 | A1* | 8/2017 | Tabandeh | A61B 34/20 |
| 2018/0036884 | A1* | 2/2018 | Chen | B25J 9/1676 |
| 2018/0064496 | A1* | 3/2018 | Hladio | A61B 90/361 |
| 2018/0168750 | A1* | 6/2018 | Staunton | A61B 34/20 |
| 2018/0214225 | A1 | 8/2018 | Hourtash et al. | |
| 2019/0005681 | A1* | 1/2019 | Blott | G06T 7/11 |
| 2019/0054620 | A1* | 2/2019 | Griffiths | A61B 34/35 |
| 2019/0214126 | A1* | 7/2019 | Goetz | A61B 6/563 |
| 2019/0290370 | A1* | 9/2019 | Brummund | H04N 23/61 |
| 2019/0321126 | A1* | 10/2019 | Otto | A61B 90/37 |
| 2021/0382559 | A1* | 12/2021 | Segev | G06V 10/806 |
| 2021/0389152 | A1* | 12/2021 | Beaurepaire | G01C 21/3635 |
| 2022/0022994 | A1* | 1/2022 | Otto | G06T 7/74 |
| 2022/0175478 | A1 | 6/2022 | Kawabata et al. | |
| 2023/0172428 | A1* | 6/2023 | Jørgensen | A61B 1/2676 600/117 |
| 2023/0368878 | A1* | 11/2023 | Molenda | G16H 70/60 |
| 2024/0081940 | A1* | 3/2024 | Otto | A61B 90/361 |

* cited by examiner

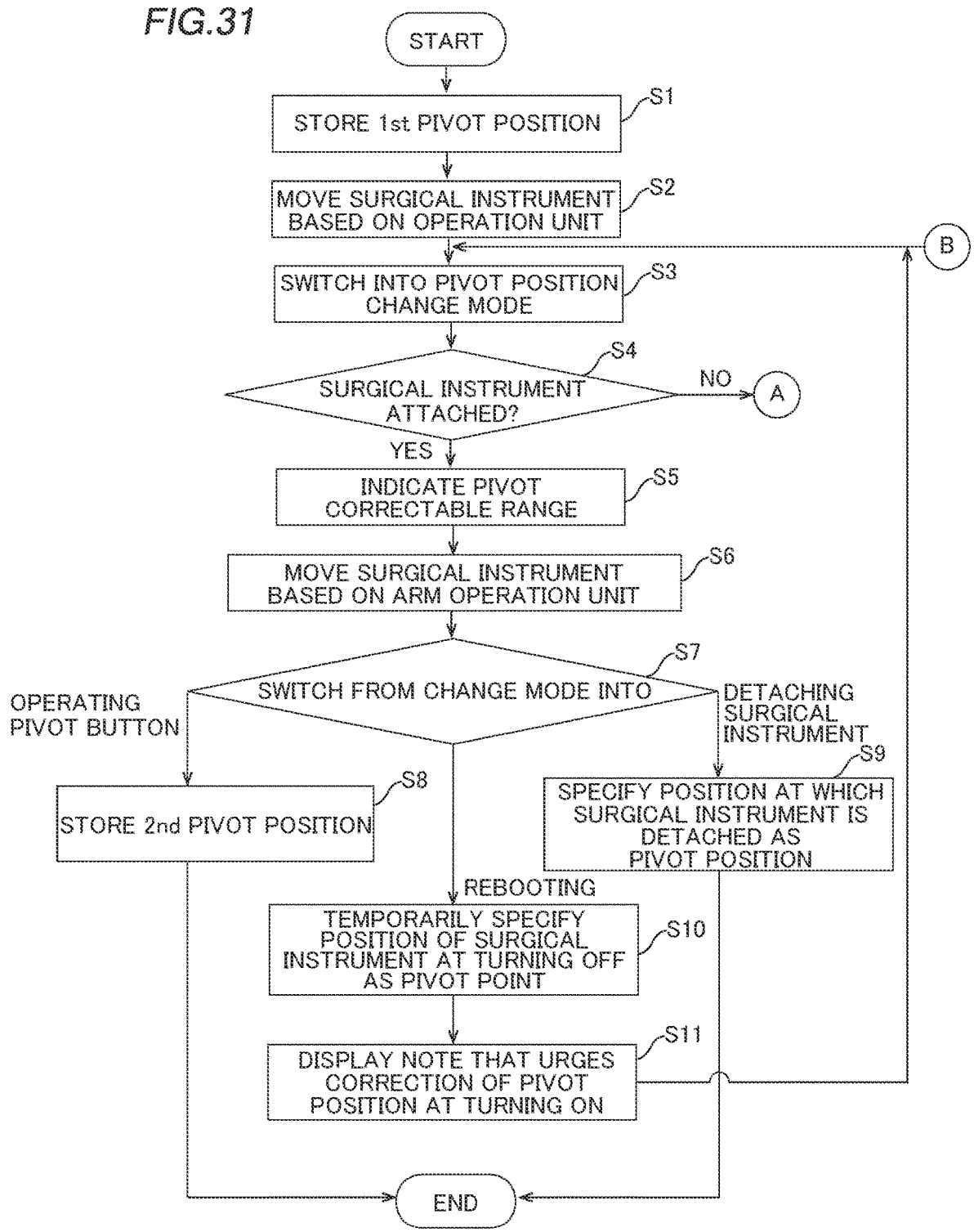

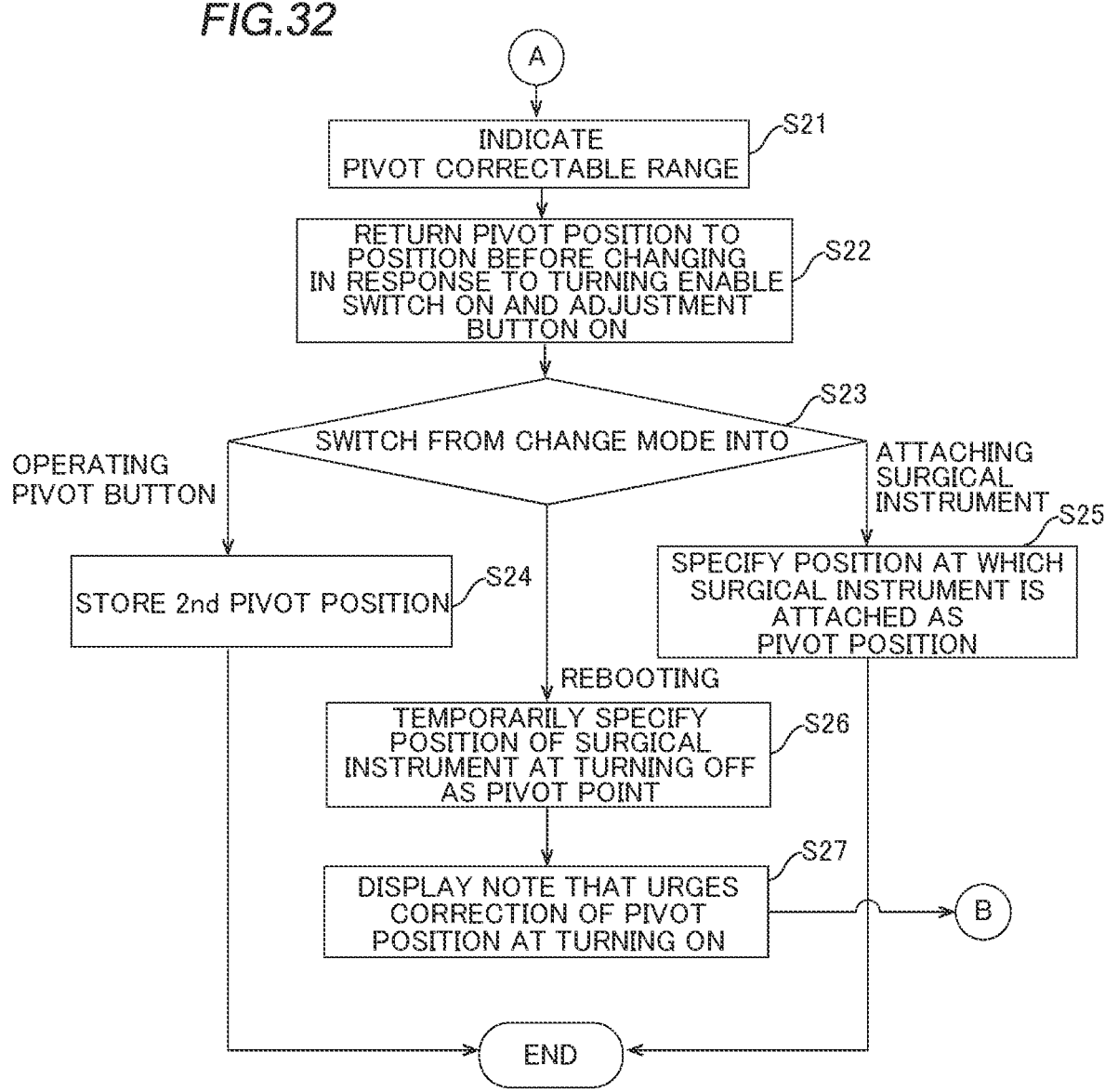

ROBOTIC SURGICAL SYSTEM AND METHOD FOR CONTROLLING ROBOTIC SURGICAL SYSTEM

CROSS-REFERENCE TO RELATED APPLICATION

The priority application number JP2022-211532, robotic surgical system and method for controlling a robotic surgical system, Dec. 28, 2022, MIZOHATA Yuichi, KOBAYASHI Ayataka, and MORIMOTO Takaki, upon which this patent application is based, are hereby incorporated by reference.

BACKGROUND OF THE INVENTION

Field of the Invention

The present disclosure relates to a robotic surgical system and a method for controlling a robotic surgical system.

Description of the Background Art

Conventionally, a robotic surgical system including a robot arm to which a surgical instrument is attached is known. Japanese Patent Laid-Open Publication No. JP 2018-94446 discloses a robot system including manipulator arms and tools attached to the manipulator arms. The manipulator arm disclosed in Patent Literature 1 has an instrument holder for translating the tool along a longitudinal direction of the arm. A cannula is held in a distal end of the instrument holder. The cannula is held by a mechanism that holds the cannula in the instrument holder. The tool is inserted into the cannula. In Japanese Patent Laid-Open Publication No. JP 2018-94446, a predetermine part of the cannula is structurally specified as a revolving axis of revolving motion of the tool. That is, in Patent Literature 1, the revolving axis of revolving motion of the tool is mechanically specified.

In such a known robotic surgical system disclosed in Japanese Patent Laid-Open Publication No. JP 2018-94446, because the manipulator arm is connected to the cannula through the mechanism that holds the cannula, space close to a surface of a body of a patient into which the cannula is inserted becomes narrow. When an assistant doctor assists an operation, the mechanism, which holds the cannula, obstructs the assistance work, and as a result the work becomes difficult in the space close to the surface of the body of the patient.

SUMMARY OF THE INVENTION

The present disclosure is intended to solve the above problem, and one object of the present disclosure is to provide a robotic surgical system and a method for controlling a robotic surgical system capable of making work easier in space close to a surface of a body of a patient, and allowing an operator to easily recognize an available change range of a pivot position when the operator changes the pivot position.

A robotic surgical system according to a first aspect of the present disclosure includes a robot arm including a distal part to which a surgical instrument is attached; a pivot position specifier configured to store a pivot position in a storage, wherein the pivot position is a pivot point of movement of the surgical instrument which is attached to the robot arm; a display configured to display an image that is captured by an endoscope; and a controller configured to display, on the display, a graphical user interface overlayed on the image captured by the endoscope, wherein the graphical user interface includes a correctable range indication indicating a pivot correctable range that is set based on the pivot position stored in the storage.

As described above, the robotic surgical system according to a first aspect of the present disclosure includes the pivot position specifier configured to store a pivot position that is a pivot point of movement of the surgical instrument, which is attached to the robot arm, in a storage. Accordingly, because the pivot position is stored in the storage by software, it is required neither to use a manipulator arm whose pivot position is structurally specified, nor to provide a manipulator arm with a mechanism that support a cannula to specify a pivot position of the manipulator arm. That is, because such a a mechanism that support a cannula is not required, it is possible to make work easier in space close to a surface of a body of a patient during surgery. Also, the controller is configured to display on the display to superimpose a graphical user interface including a correctable range indication indicating a pivot correctable range that is specified based on the pivot position that is stored in the storage on the image, which is captured by the endoscope. Because a correctable range indication indicating a pivot correctable range is displayed on the display, an operator can view the display and easily recognize a correctable range of the pivot position. Also, because the correctable range indication is superimposed on the image captured by the endoscope and displayed on the display, the operator can change the pivot position while viewing the image captured by the endoscope. As a result, it is possible to make work easier in space close to a surface of a body of a patient during surgery, and in a case in which the pivot position is changed to release a pull of the patient's abdominal wall by a trocar T when the body of a patient is moved, the operator can easily recognize the correctable range of the pivot position. Also, in a case in which the pivot position is changed to avoid interference of robot arms with each other or to increase a movable range of the surgical instrument in the body of the patient, the operator can easily recognize the correctable range of the pivot position.

A method for controlling a robotic surgical system according to a second aspect of the present disclosure includes storing a pivot position that is a pivot point of movement of a surgical instrument that is attached to a robot arm in a storage in accordance with an operating input accepted by a pivot position specifier; and displaying, on a display, a graphical user interface overlayed on an image captured by the endoscope, wherein the graphical user interface includes a correctable range indication indicating a pivot correctable range that is set based on the pivot position is stored in the storage.

As discussed above, the method for controlling a robotic surgical system according to the second aspect of the present disclosure includes the storing a pivot position that is a pivot point of movement of a surgical instrument that is attached to a robot arm in a storage in accordance with an operating input accepted by a pivot position specifier. Accordingly, because the pivot position is stored in the storage by software, it is required neither to use a manipulator arm whose pivot position is structurally specified, nor to provide a manipulator arm with a mechanism that support a cannula to specify a pivot position of the manipulator arm. That is, because such a mechanism that support a cannula is not required, it is possible to make work easier in space close to a surface of a body of a patient during surgery. Also, as discussed above, the method for controlling a robotic surgical system includes displaying a graphical user interface including a correctable range indication indicating a pivot correctable range that is specified based on the pivot position that is stored in the storage to be superimposed on an image that is captured by an endoscope on a display. Because a correctable range indication indicating a pivot correctable range is displayed on the display, it is possible to provide a method for controlling a robotic surgical system capable of allowing an operator to easily recognize a correctable range of the pivot position by viewing the display. Also, because the correctable range indication is superimposed on the image captured by the endoscope and displayed on the display, the operator can change the pivot position while viewing the image captured by the endoscope. As a result, it is possible to provide a method for controlling a robotic surgical system capable of making work easier in space close to a surface of a body of a patient during surgery, and allowing the operator can easily recognize the correctable range of the pivot position in a case in which the pivot position is changed to release a pull of the patient's abdominal wall by a trocar T when the body of a patient is moved. Also, it is possible to provide a method for controlling a robotic surgical system capable of allowing the operator to easily recognize the correctable range of the pivot position in a case in which the pivot position is changed to avoid interference of robot arms with each other or to increase a movable range of the surgical instrument in the body of the patient.

According to this disclosure, it is possible to make work easier in space close to a surface of a body of a patient during surgery, and in a case in which the pivot position is changed to release a pull of the patient's abdominal wall by a trocar when the body of a patient is moved, an operator can easily recognize the correctable range of the pivot position.

BRIEF DESCRIPTION OF THE DRAWINGS

FIG. 31 is a flowchart of step S1 to step S11 illustrating a method for controlling the surgical robot according to the one embodiment.
FIG. 32 is a flowchart of step S21 to step S27 illustrating a method for controlling the surgical robot according to the one embodiment.

Figure 1:
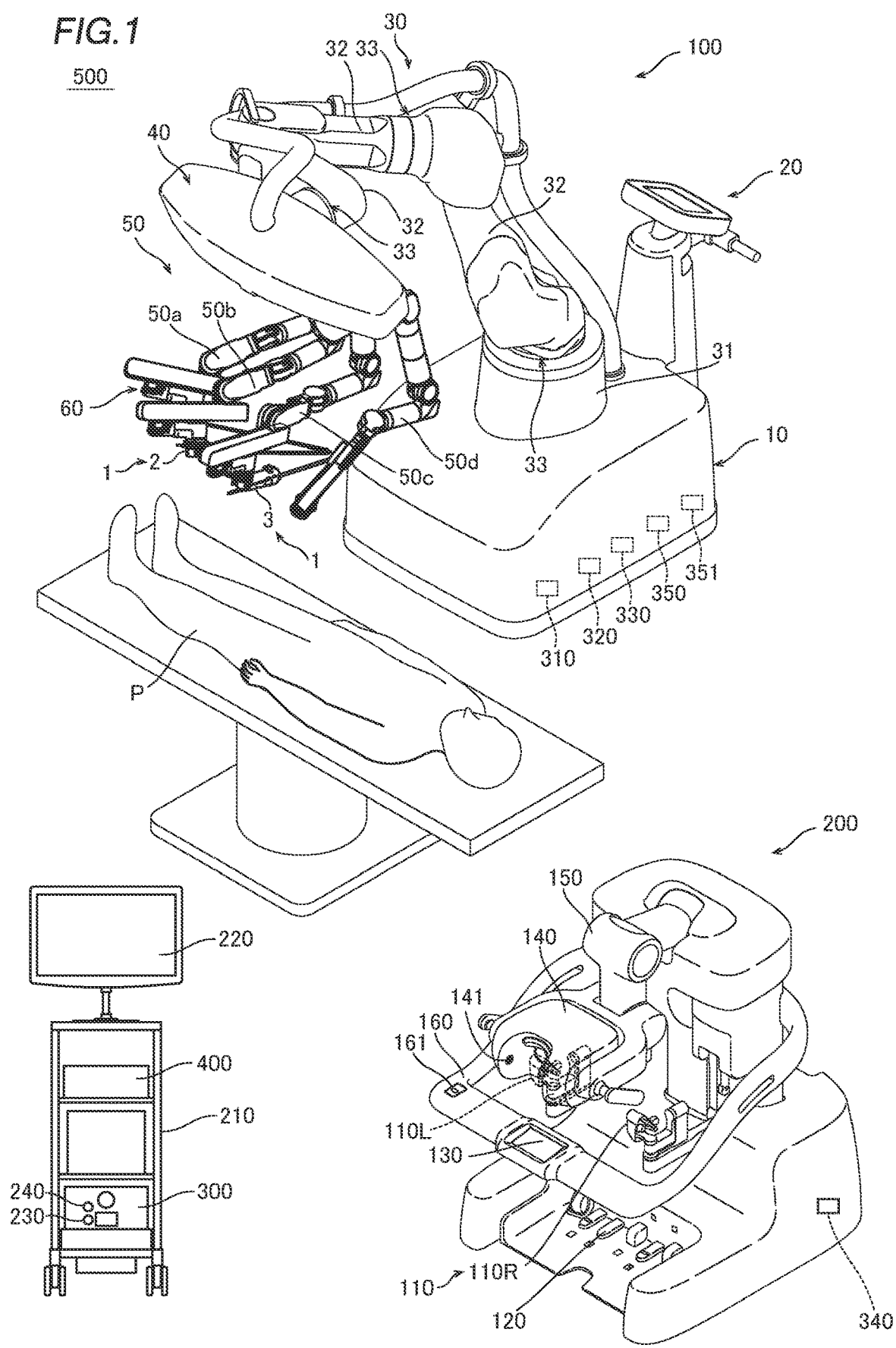
FIG. 1 is a block diagram showing a configuration of a robotic surgical system according to one embodiment.

DESCRIPTION OF THE PREFERRED EMBODIMENT (Configuration of Robotic Surgical System)

The following description describes a configuration of a robotic surgical system 500 according to this embodiment. The robotic surgical system 500 includes a surgical robot 100, a remote control apparatus 200, a vision unit 300 and an image processing unit 400. The vision unit 300 is an example of a controller.

Figure 4:
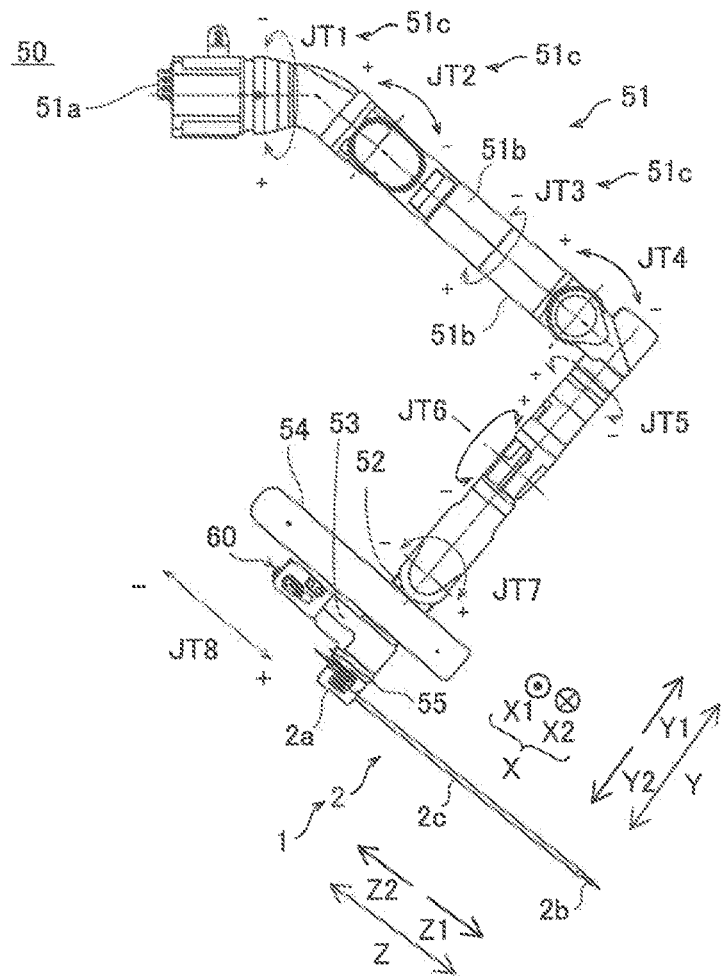
FIG. 4 is a block diagram showing a configuration of a robot arm according to the one embodiment.

In this specification, a longitudinal direction of a surgical instrument 1 is defined as a Z direction as shown in FIG. 4. A distal part of the surgical instrument 1 is defined as a z1 side, and a proximal part of the surgical instrument 1 is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

Figure 3:
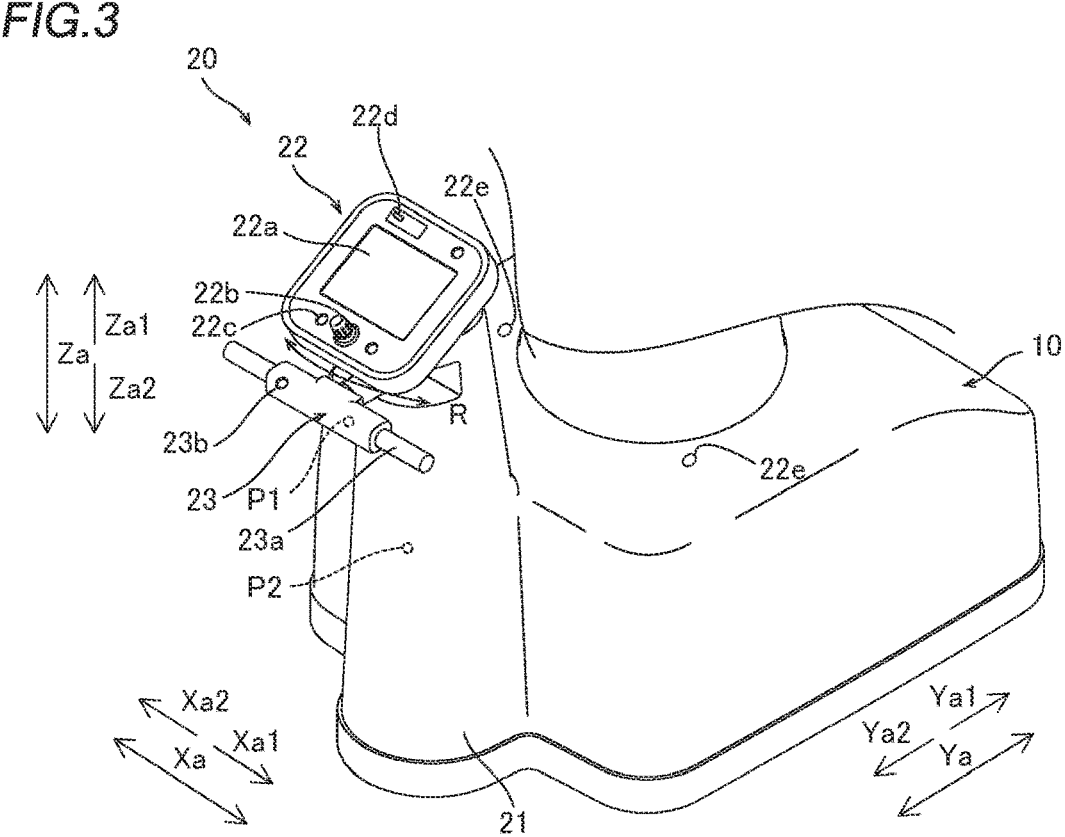
FIG. 3 is a diagram showing a configuration of the medical cart according to the one embodiment.

In this specification, a leftward/rightward direction from the viewpoint of an operator who operates a display 22a of an input 22 is defined as an Xa direction as shown in FIG. 3. A rightward direction is defined as an Xa1 direction, and a leftward direction is defined as an Xa2 direction. A frontward/rearward direction from the viewpoint of the operator who operates the display 22a of the input 22 is defined as a Ya direction. A frontward direction is defined as an Ya1 direction, and a rearward direction is defined as an Ya2 direction. A direction orthogonal to a floor on which the surgical robot 100 is arranged is defined as a Za direction. An upward direction is defined as a Za1 direction, and a downward direction is defined as a Za2 direction.

As shown in FIG. 1, the surgical robot 100 is arranged in an operating room. The remote control apparatus 200 is located remote from the surgical robot 100. Also, the remote control apparatus 200 is configured to receive instructions as to the surgical instruments 1. Specifically, an operator, such as a doctor, can provide the remote control apparatus 200 with an instruction to instruct a desired motion of the surgical robot 100. The remote control apparatus 200 transmits the provided command to the surgical robot 100. The surgical robot 100 is configured to perform the motion in accordance with the command received. The surgical robot 100 is arranged in the operating room, which is a sterile field.

(Configuration of Surgical Robot)

As shown in FIG. 1, the surgical robot 100 includes a medical cart 10, a cart positioner operation unit 20, a positioner 30, an arm base 40, a plurality of robot arms 50 and arm operation units 60.

As shown in FIG. 3, the cart positioner operation unit 20 is arranged in a rear part of the medical cart 10 and supported by a cart positioner operation support 21, and the medical cart 10 or the positioner 30 can be moved in accordance with a manual operation of the cart positioner operation unit 20. The cart positioner operation unit 20 includes the input 22 and an operating handle 23. The input 22 is configured to accept instructions to move or change orientations of the positioner 30, the arm base 40 and the plurality of robot arms 50 to prepare a surgical operation mainly before the operation is carried out. The cart positioner operation unit 20 includes the operating handle 23, a stabilizer 24 and an electric cylinder 25 shown in FIG. 10. The stabilizer 24 includes an electric cylinder, and the medical cart 10 can be prevented from moving by lifting wheels of the medical cart 10 off the ground by using the stabilizer 24.

Figure 2:
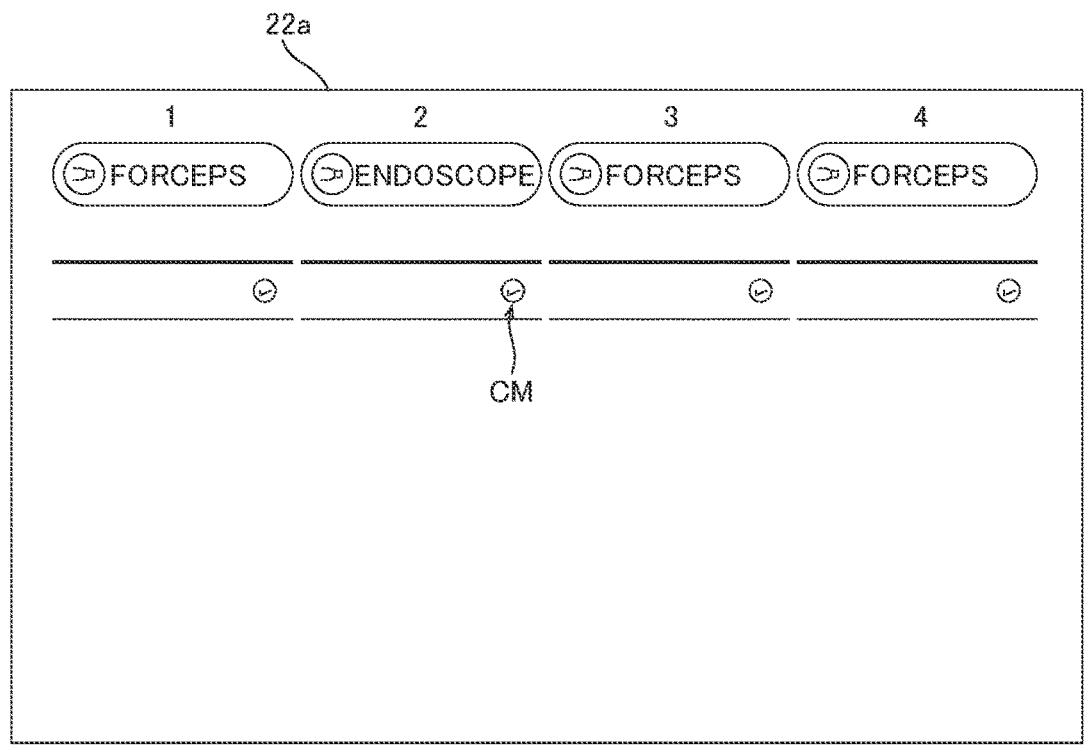
FIG. 2 is a diagram showing a display of a medical cart according to the one embodiment.

As shown in FIG. 3, the input 22 of the cart positioner operation unit 20 includes the display 22a, a joystick 22b, an enable switch 22c, an error reset button 22d and speakers 22e. For example, the display 22a is a liquid crystal panel. As shown in FIG. 2, the display 22a indicates numbers corresponding to the plurality of robot arms 50. Also, the display 22a indicates types of surgical instruments 1 attached to the plurality of robot arms 50. The display 22a indicates checkmarks CM representing that their pivot positions PP (discussed later) have been set.

As shown in FIG. 3, the joystick 22b is arranged in proximity to the input 22 of the cart positioner operation unit 20. When an operation mode displayed on the input 22 is selected, the positioner 30 can be three-dimensionally moved by operating the joystick 22b.

The enable switch 22c is arranged in proximity to the joystick 22b of the cart positioner operation unit 20. The enable switch 22c is configured to enable or disable movement of the positioner 30. When the enable switch 22c is pressed so that movement of the positioner 30 is enabled, the positioner 30 can be moved in accordance with a manual operation of the joystick 22b.

The error reset button 22d is configured to reset an error of the robotic surgical system 500. An exemplary error is an error of abnormal deviation. The speakers 22e are a pair of speakers. The pair of speakers 22e are arranged at a position in the medical cart 10 in proximity to the positioner 30.

Also, the operating handle 23 is arranged in proximity to the display 22a of the cart positioner operation unit 20. The operating handle 23 includes a throttle grip 23a that is configured to be gripped and twisted by an operator such as nurse, engineer, etc. to control movement of the medical cart 10. Specifically, the operating handle 23 is arranged under the input 22. The medical cart 10 can move forward when the throttle grip 23a is twisted from a near side toward a far side. The medical cart 10 can move backward when the throttle grip 23a is twisted from the far side toward the near side. A speed of the medical cart 10 can be changed in accordance with a twisting amount of the throttle grip 23a. In addition, the operating handle 23 is configured to swing leftward and rightward as shown by an R direction, and to rotate the medical cart 10 depending on the swinging operation of the operating handle 23.

Also, the operating handle 23 of the cart positioner operation unit 20 includes an enable switch 23b configured to enable or disable movement of the medical cart 10. When the enable switch 23b is pressed so that movement of the medical cart 10 is enabled, the medical cart 10 can be moved in accordance with a manual operation of the throttle grip 23a of the operating handle 23.

For example, as shown in FIG. 1, the positioner 30 is constructed of a 7-axis multi-joint robot. The positioner 30 is arranged on the medical cart 10. The positioner 30 is configured to adjust a position of the arm base 40. The positioner 30 can move the position of the arm base 40 in three dimensions.

The positioner 30 includes a base 31, and a plurality of links 32 coupled to the base 31. The links 32 are coupled to each other by joints 33.

The arm base 40 is attached to a distal end of the positioner 30. In the plurality of robot arms 50, the proximal end of each robot arm 50 is attached to the arm base 40. The plurality of robot arms 50 are foldable into a storage posture. The arm base 40 and the plurality of robot arms 50 covered by sterile drapes when used. The robot arm 50 is configured to support surgical instruments 1.

Figure 10:
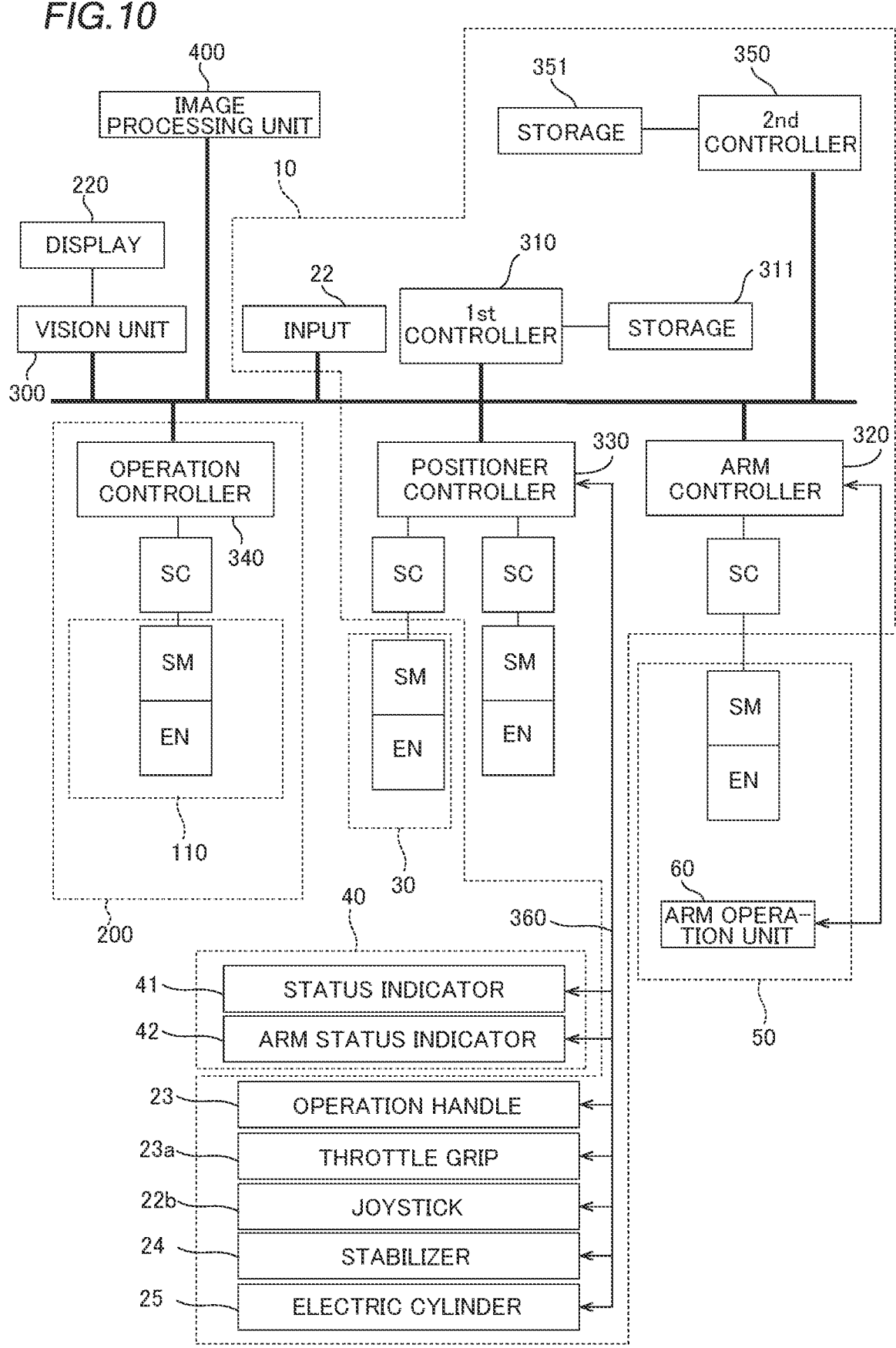
FIG. 10 is a control block diagram of a surgical robot according to the one embodiment.

A status indicator 41 and an arm status indicator 42 shown in FIG. 10 are provided in the arm base 40. The status indicator 41 is configured to indicate a status of robotic surgical system 500. The arm status indicator 42 is configured to indicate states of robot arms 50.

Two or more robot arms 50 are provided as a plurality of robot arms. Specifically, four robot arms 50a, 50b, 50c and 50d are provided. The robot arms 50a, 50b, 50c and 50d have a similar configuration to each other. The robot arm 50c is an example of a second robot arm.

As shown in FIG. 4, each robot arm 50 includes an arm 51, a first link part 52, a second link part 53, and a translation mechanism 54. The robot arm 50 has JT1, JT2, JT3, JT4, JT5, JT6 and JT7 axes as rotation axes, and a JT8 axis as a linear-motion axis. The axes from JT1 to JT7 are rotation axes of the joint 51c of the arm 51. The JT7 axis is a rotational axis of the first link part 52. The JT8 axis is a linear-motion axis along which the second link part 53 is moved relative to the first link part 52 in the Z direction by the translation mechanism 54. The arm 51 includes a base 51a, links 51b and joints 51c.

The arm 51 is constructed of a 7-axis multi-joint robot arm. The first link part 52 is arranged in a distal end of arm 51. The arm operation unit 60 discussed later is attached to the second link part 53. The translation mechanism 54 is arranged between the first link part 52 and the second link part 53. The second link part 53 includes a holder 55 configured to hold the surgical instrument 1. The translation mechanism 54 is configured to translationally move the holder 55 to which the surgical instrument 1 is attached between a first position and a second position. The first position is a position of a Z2-direction side end of a moving range of the holder 55 moved by the translation mechanism 54 along the JT8 axis. The second position is a position of a z1-direction side end of the moving range of the holder 55 moved by the translation mechanism 54 along the JT8 axis.

Figure 14:
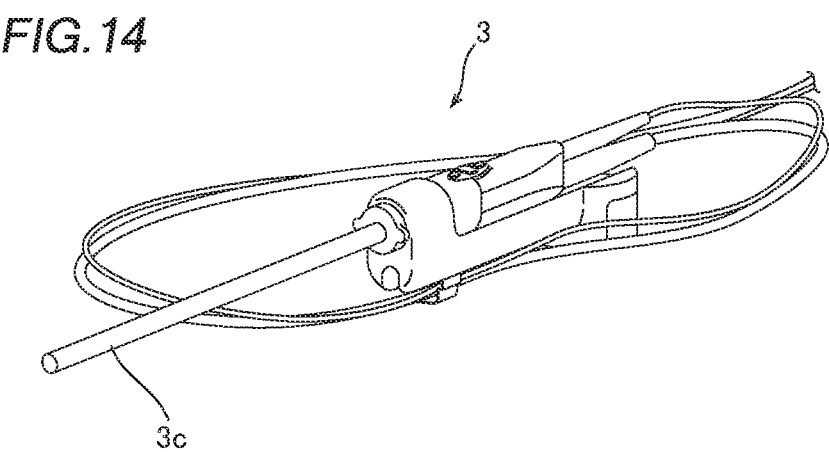
FIG. 14 is a diagram showing an endoscope.
Figure 15:
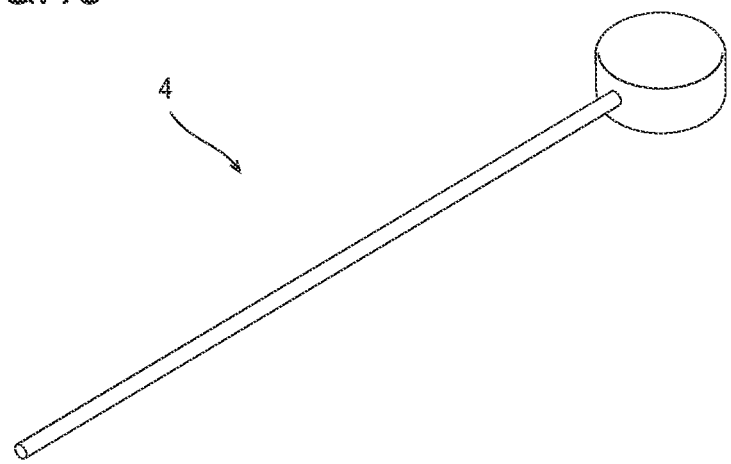
FIG. 15 is a diagram showing a pivot-position setting tool.

Surgical instruments 1 can be attached to the distal ends of the plurality of robot arms 50. The surgical instruments 1 include, for example, replaceable instruments 2, an endoscope 3 (see FIG. 14) configured to capture images GR21 (see FIG. 25) of a part to be operated, a pivot-position setting tool 4 (see FIG. 15) to set a pivot position PP described below, etc. The instrument 2 includes a driven unit 2a, a forceps 2b and a shaft 2c.

As shown in FIG. 1, an endoscope 3 is attached to the distal end of one, e.g., the robot arm 50c of the robot arms 50, and the instruments 2 are attached to the distal ends of the others, e.g., the robot arms 50a, 50b and 50d. The endoscope 3 is attached to one of two robot arms 50b and 50c, which are located in a central part, of the four robot arms 50 arranged adjacent to each other.

(Configuration of Instrument)

Figure 5:
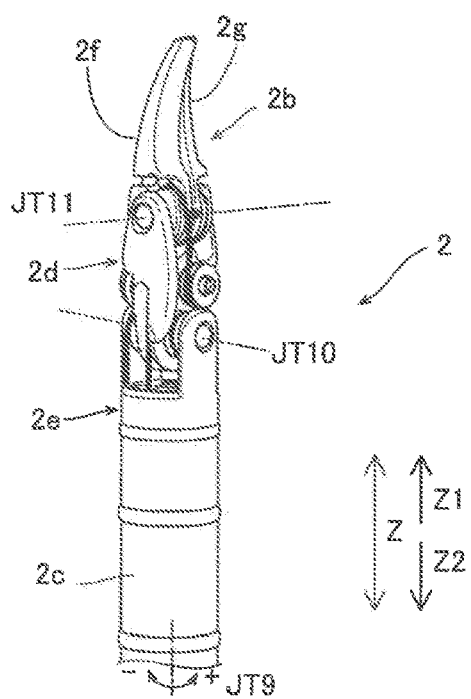
FIG. 5 is a diagram showing a forceps.

For example, as shown in FIG. 5, a forceps 2b is attached to the distal end of the instrument 2. Tools that include a joint and can be attached to the distal end of the instrument 2 can include scissors, a grasper, a needle holder, a microdissector, a staple applier, a tucker, a vacuum cleaning tool, a snare wire, a clip applier, etc., other than the forceps 2b. Tools that do not include any joint and can be attached to the distal end of the instrument 2 can include a cutting blade, a cautery probe, a cleaner, a catheter, a vacuum orifice, etc.

The forceps 2b includes a first support 2d and a second support 2e. The first support 2d is configured to rotatably support a proximal end side of jaws 2g and 2f about a JT11 axis. The second support 2e is rotatably configured to support a base-end side of the first support 2d about a JT10 axis. The shaft 2c can rotate about a JT9 axis. The jaws 2g and 2f can rotate about the JT11 axis to open and close.

(Configuration of Arm Operation Unit)

Figure 6:
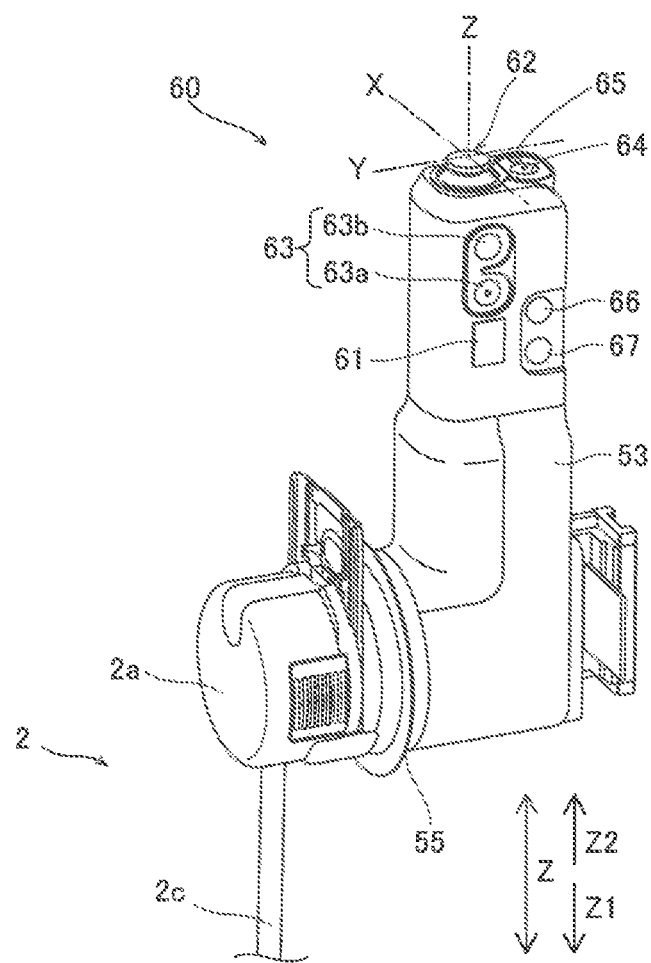
FIG. 6 is a block diagram showing a configuration of an arm operation unit according to the one embodiment.

As shown in FIG. 6, the arm operation unit 60 is mounted to the robot arm 50, and is configured to operate the robot arm 50. Specifically, the arm operation unit 60 is mounted to the second link part 53.

The arm operation unit 60 include an enable switch 61, a joystick 62, linear switches 63, a mode switching button 64, a mode indicator 65, a pivot button 66, and an adjustment button 67. The enable switch 61 and the adjustment button 67 are examples of a pivot position returner. The pivot button 66 is an example of a pivot position specifier.

The enable switch 61 is configured to enable or disable movement of the robot arm 50 by means of the joystick 62 and the linear switches 63 when pressed. Movement of the surgical instrument 1 by the robot arm 50 is enabled when the enable switch 61 is pressed while the arm operation unit 60 is grasped by an operator such as nurse, assistant, etc.

The joystick 62 is an operation tool configured to control movement of the surgical instrument 1 by the robot arm 50. The joystick 62 is an operation tool configured to control a moving direction and a moving speed of the robot arm 50. The robot arm 50 can be moved in accordance with a tilting direction and a tilting angle of the joystick 62.

The linear switches 63 are a switch for moving the surgical instrument 1 in the Z direction, which is a longitudinal direction of the instrument 1. The linear switches 63 includes a linear switch 63a for moving the surgical instrument 1 in a direction in which the surgical instrument 1 is inserted into a patient P, and a linear switch 63b for moving the surgical instrument 1 in a direction in which the surgical instrument 1 is moved away from the patient P. The linear switch 63a and the linear switch 63b are constructed of a press-button switch.

Figure 7:
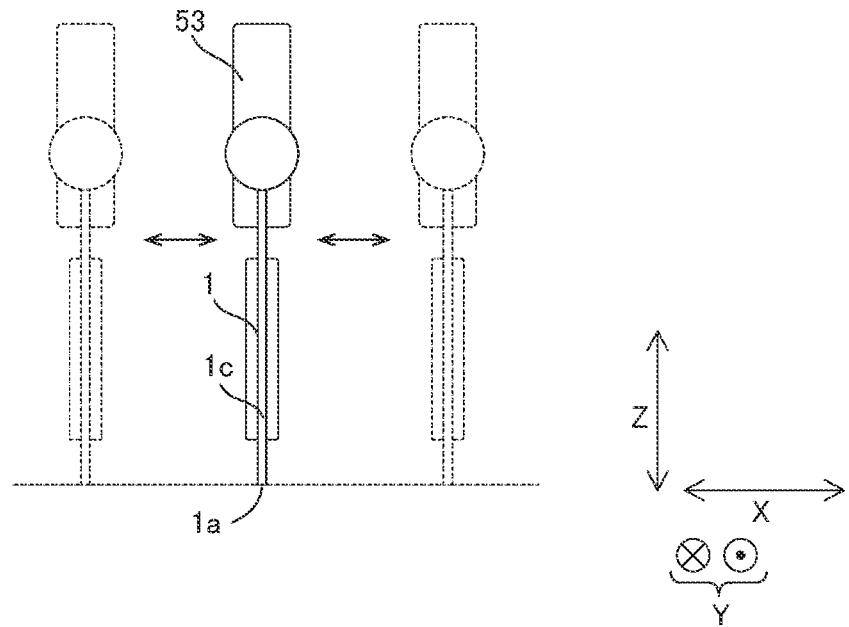
FIG. 7 is a diagram illustrating translational movement of the robot arm.
Figure 8:
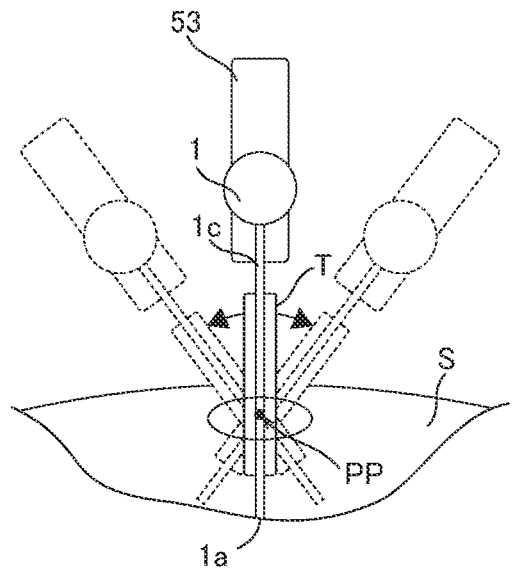
FIG. 8 is a diagram illustrating rotational movement of the robot arm.

The mode switching button 64 is a press-button switch for switching between a translation mode in which the surgical instrument 1 is translationally moved, and a rotation mode in which the surgical instrument 1 is rotated. As shown in FIG. 7, in the translation mode in which the robot arm 50 is translationally moved, the robot arm 50 can be moved so that the distal end 1a of the surgical instrument 1 can be moved in an X-Y plane. As shown in FIG. 8, in the rotation mode in which the robot arm 50 is rotated, in a case in which any pivot position PP is not stored in the storage 351, the robot arm 50 can be moved so that the forceps 2b can be rotated about a center of the forceps 2b of the instrument 2 as the surgical instrument 1 on the JT11 axis or the distal end of forceps 2b as a rotation axis, and in a case in which a pivot position PP is stored in the storage 351, the robot arm 50 can be moved so that the forceps 2b can be rotated about the pivot position PP as a rotation axis. In this case, the surgical instrument 1 is rotated with the shaft 1c of the surgical instrument 1 being inserted into a trocar T. The mode switching button 64 is arranged on a surface on a Z-direction side of the arm operation unit 60.

The mode indicator 65 is configured to indicate which mode is selected. The mode indicator 65 is configured to light on to indicate the rotation mode, and to light off indicate the translation mode. The mode indicator 65 also serves as a pivot position indicator to indicate that the pivot position PP is set. The mode indicator 65 is arranged on the surface on the Z-direction side of the arm operation unit 60.

The pivot button 66 is a press-button switch configured to set the pivot position PP, which corresponds to the rotation axis of the surgical instrument 1 attached to the robot arm 50.

The adjustment button 67 is a button configured to optimize a position of the robot arm 50. After the pivot position PP is set with respect to the robot arm 50 to which the endoscope 3 is attached, when the adjustment button 67 is pressed positions of the other robot arms 50 and the arm base 40 is optimized. The adjustment button 67 is a button different from the enable switch 61.

(Remote Control Apparatus)

For example, as shown in FIG. 1, the remote control apparatus 200 is arranged in an operating room or outside the operating room. The remote control apparatus 200 includes operation units 110, foot pedals 120, a touch panel 130, a monitor 140, a support arm 150, a support bar 160, and an error reset button 161. The operation units 110 serves as a handle for operation that is configured to receive commands from an operator such as doctor.

The operation units 110 are handle configured to manipulate the surgical instrument 1. Also, the operation units 110 are configured to receive manipulated amounts corresponding to the surgical instruments 1. The operation units 110 include an operation unit 110L that is arranged on a left side from viewpoint of an operator such as doctor and is configured to be manually operated by operator's left hand, and an operation unit 110R that is arranged on a right side from viewpoint of the operator such as doctor and is configured to be manually operated by a right hand of the operator.

The monitor 140 is a scope-type display device configured to display images GR21 captured by the endoscope 3. The monitor 140 includes an information producer 141. The information producer 141 is configured to produce an error sound. The support arm 150 supports the monitor 140, and can adjust a height of the monitor 140 to a height of eyes of the operator such as doctor. The touch panel 130 is arranged on the support bar 160. When a head of the operator is detected by a sensor arranged in proximity to the monitor 140, the surgical robot 100 can accept manual operations from the remote control apparatus 200. The operator will manually operate the operation unit 110 and the foot pedals 120 while seeing of an affected area on the monitor 140. Commands can be provided to the remote control apparatus 200 in accordance with these manual operations. Instructions provided to the remote control apparatus 200 are transmitted to the surgical robot 100.

The error reset button 161 is arranged on the support bar 160. The error reset button 161 is configured to reset an error of the robotic surgical system 500. An exemplary error is an error of abnormal deviation.

Figure 9:
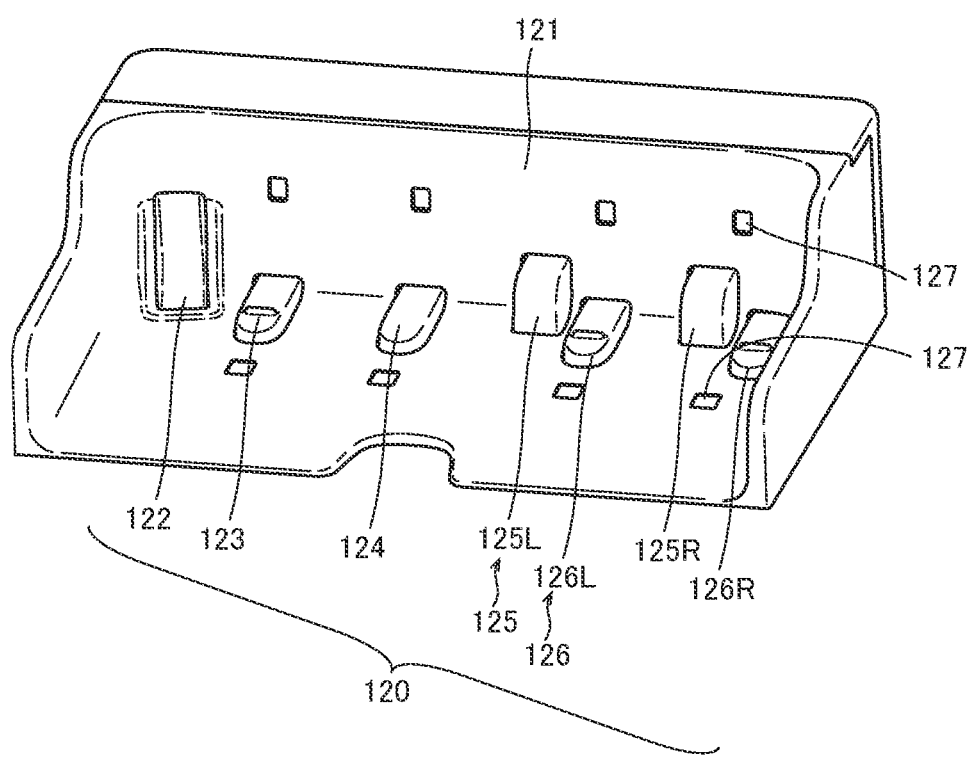
FIG. 9 is a perspective diagram showing a foot pedal according to the one embodiment.

As shown in FIG. 9, a plurality of foot pedals 120 configured to activate functions of the surgical instruments 1. The plurality of foot pedals 120 are provided in a base 121. The foot pedals 120 include a switching pedal 122, a clutch pedal 123, a camera pedal 124, incision pedals 125, coagulation pedals 126, and foot detectors 127. The switching pedal 122, the clutch pedal 123, the camera pedal 124, the incision pedals 125, the coagulation pedals 126 are configured to be operated by a foot of the operator. Also, the incision pedals 125 include an incision pedal 125R corresponding to a right-side robot arm 50 and an incision pedal 125L corresponding to a left-side robot arm 50. Also, the coagulation pedals 126 include a coagulation pedal 126R corresponding to a right-side robot arm 50 and a coagulation pedal 126L corresponding to a left-side robot arm 50.

The switching pedal 122 is configured to switch between the robot arms 50 to be operated by the operation unit 110. The clutch pedal 123 is configured to activate a clutch function of temporally halting operation connection between the robot arm 50 and the operation unit 110. While the clutch pedal 123 is pressed by the operator, instructions provided by the operation unit 110 is not transmitted to the robot arm 50. While the camera pedal 124 is pressed by the operator, the robot arm 50 that holds the endoscope 3 can be operated through the operation unit 110. While the incision pedal 125 or the coagulation pedal 126 is pressed, an electric surgical apparatus is active.

The foot detectors 127 are configured to detect the foot of the operator that operates the foot pedal 120. The foot detectors 127 are configured to detect the foot that hovers above their corresponding foot pedal 120. The foot detectors 127 are arranged on the base 121.

As shown in FIG. 1, a cart 210 holds a vision unit 300 and an image processing unit 400. The image processing unit 400 is configured to process images GR21 captured by the endoscope 3. A display 220 is arranged on the cart 210. The display 220 is configured to display images GR21 captured by the endoscope 3. An error reset button 230 and an information producer 240 are arranged on a vision unit 300. The error reset button 230 is configured to reset an error of the robotic surgical system 500. An exemplary error is an error of abnormal deviation. The information producer 240 is configured to produce an error sound.

(Configuration of Control System)

As shown in FIG. 10, the robotic surgical system 500 includes a first controller 310, an arm controller 320, a positioner controller 330, operation controllers 340 and a second controller 350. In addition, the robotic surgical system 500 includes a storage 311 connected to the first controller 310, and a storage 351 connected to the second controller 350. As shown in FIG. 1, the second controller 350 and the storage 351 are is arranged in the medical cart 10, for example.

The first controller 310 is accommodated in the medical cart 10, and configured to communicate with the arm controller 320 and the positioner controller 330 so that the robotic surgical system 500 is entirely controlled. Specifically, the first controller 310 is configured to control the arm controller 320, the positioner controller 330 and the operation controllers 340 by using the communications with them. The first controller 310 is connected to the arm controller 320, the positioner controller 330 and the operation controllers 340 through LAN, etc. The first controller 310 is arranged in the medical cart 10.

Each of the plurality of robot arms 50 includes the arm controller 320. In other words, a plurality of arm controllers 320 the number of which corresponds to the number of the plurality of robot arms 50 are included in the medical cart 10.

As shown in FIG. 10, the input 22 is connected to the first controller 310 through LAN, etc. The status indicator 41, the arm status indicator 42, the operating handle 23, the throttle grip 23a, the joystick 22b, the stabilizer 24 and the electric cylinder 25 are connected to the positioner controller 330 through a wiring line 360 by means of a communication network that can share information with them by using serial communication. Although all of these status indicator 41, arm status indicator 42, etc. are connected to each other through one wiring line 360 in FIG. 10, wiring lines 360 are actually provided to each of the status indicator 41, the arm status indicator 42, the operating handle 23, the throttle grip 23a, the joystick 22b, the stabilizer 24 and the electric cylinder 25.

Figure 11:
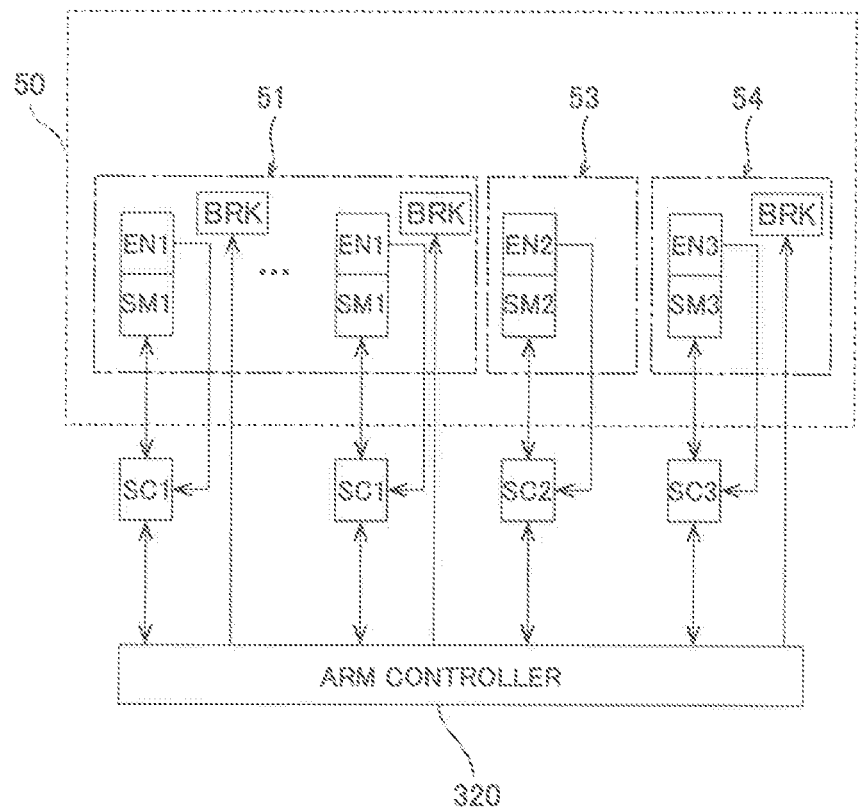
FIG. 11 is a control block diagram of the robot arm according to the one embodiment.

As shown in FIG. 11, each arm 51 includes a plurality of servomotors SM1, a plurality of encoders EN1 and a plurality of speed reducers corresponding to a plurality of joints 51c. The encoder EN1 is configured to detect a rotation angle of the servomotor SM1. The speed reducer is configured to reduce a rotation of the servomotor SM1 whereby increasing its torque. A servo controller SC1 is configured to control the servomotor SM1, and is arranged in the medical cart 10 adjacent to the arm controller 320. Also, the encoder EN1 is configured to detect the rotation angle of the servomotor SM1, and is electrically connected to the servo controller SC1.

The second link part 53 includes a servomotor SM2 configured to rotate a driven member arranged in a driven unit 2a of the surgical instrument 1, an encoder EN2, and a speed reducer. The encoder EN2 is configured to detect a rotation angle of the servomotor SM2. The speed reducer is configured to reduce a rotation of the servomotor SM2 whereby increasing its torque. The medical cart 10 includes a servo controller SC2 configured to control the servomotor SM2 for driving the surgical instrument 1. The encoder EN2 for detecting the rotation angle of the servo motor SM2 is electrically connected to the servo control unit SC2. Note that a plurality of servomotors SM2, a plurality of encoders EN2 and a plurality of servo controllers SC2 are included.

The translation mechanism 54 includes a servomotor SM3 configured to translationally move the surgical instrument 1, an encoder EN3, and a speed reducer. The encoder EN3 is configured to detect a rotation angle of the servomotor SM3. The speed reducer is configured to reduce a rotation of the servomotor SM3 whereby increasing its torque. The medical cart 10 includes a servo controller SC3 configured to control the servomotor SM3 for translationally moving the surgical instrument 1. The encoder EN3 for detecting the rotation angle of the servo motor SM3 is electrically connected to the servo control unit SC3.

The first controller 310 is configured to generate instruction values that specify positions of the servomotor SM1, SM2 and SM3 in accordance with manual operation that is received by the remote control apparatus 200, and to drive the servomotor SM1, SM2 and SM3 in accordance with the instruction values. If any of differences between instruction values and positions of servomotor SM1, SM2 and SM3 detected by sensors becomes greater than an allowable range, the first controller 310 determines an error of abnormal deviation.

Figure 12:
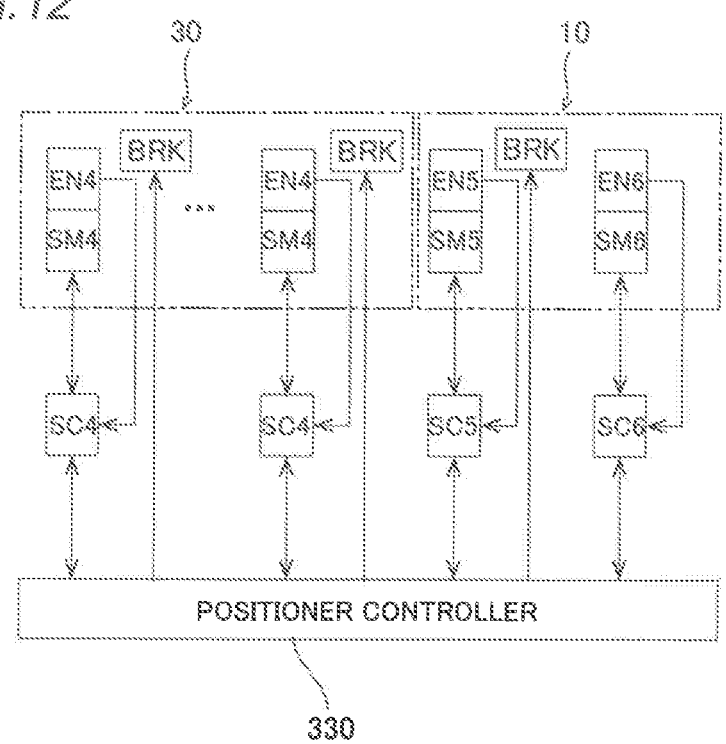
FIG. 12 is a control block diagram of a positioner and the medical cart according to the one embodiment.

As shown in FIG. 12, the positioner 30 includes a plurality of servomotors SM4, a plurality of encoders EN4 and a plurality of speed reducers corresponding to a plurality of joints 33 of the positioner 30. Each encoder EN4 is configured to detect a rotation angle of the servomotor SM4. The speed reducer is configured to reduce a rotation of the servomotor SM4 whereby increasing its torque.

The medical cart 10 includes wheels including front wheels as driving wheels, and rear wheels configured to be steered by manually operating the handle 23. The rear wheels are arranged closer to the operating handle 23 with respect to the front wheels. The medical cart 10 includes a servomotor SM5 configured to drive the front wheels of the medical cart 10, an encoder EN5, speed reducers, and brakes. The speed reducer is configured to reduce a rotation of the servomotor SM5 whereby increasing its torque. In addition, the potentiometer P1 shown in FIG. 3 is located on the operating handle 23 of the cart positioner operation unit 20, and the servo motor SM5 of the front wheels is driven based on the rotation angle detected by the potentiometer P1 in response to the twisting of the throttle grip 23a. The rear wheels of the medical cart 10 have a twin-wheel type structure, and the rear wheels can be steered in accordance with a rightward/leftward turn of the operating handle 23. Also, the operating handle 23 of the cart positioner operation unit 20 includes a potentiometer P2 shown in FIG. 3 on a turning shaft, and the rear wheel of the medical cart 10 is provided with a servomotor SM6, an encoder EN6, and speed reducers. The speed reducer is configured to reduce a rotation of the servomotor SM6 whereby increasing its torque. The servomotor SM6 can be driven in accordance with a rotation angle detected by the potentiometer P2 in response to a rightward/leftward turning amount of the operating handle 23. In other words, power is assisted by the servomotor SM6 when the rear wheels are steered by turning the operating handle 23 rightward or leftward.

The medical cart 10 can be moved forward or rearward by driving the front wheels. Also, the medical cart 10 can be turned rightward or leftward by steering the rear wheels by turning the operating handle 23 of the cart positioner operation unit 20.

As shown in FIG. 12, the medical cart 10 includes servo controllers SC4 configured to control the servomotors SM4 for moving the positioner 30. Also, the encoder EN4 is configured to detect the rotation angle of the servomotor SM4, and is electrically connected to the servo controller SC4. The medical cart 10 includes a servo controller SC5 configured to control the servomotor SM5 for driving the front wheels of the medical cart 10. The encoder EN5 for detecting the rotation angle of the servo motor SM5 is electrically connected to the servo control unit SC5. The medical cart 10 includes a servo controller SC6 configured to control the servomotor SM6 for power assistance to steering of the rear wheels of the medical cart 10. The encoder EN6 for detecting the rotation angle of the servo motor SM6 is electrically connected to the servo control unit SC6.

As shown in FIGS. 11 and 12, the joints 51c of the arm 51, and the joints 33 of the positioner 30 include their brake BRK. Also, the front wheels of the medical cart 10, the arm base 40 and the translation mechanism 54 include their brake BRK. The arm controller 320 is configured to one-directionally transmit control signals to the brakes BRK of the joints 51c of the arm 51, and the translation mechanism 54. The control signals are configured to indicate on/off of the brakes BRK. The signals indicating on of the brakes BRK include a signal that instructs the brake BRK to keep activating. The control signals transmitted from the positioner controller 330 to the brakes BRK included in the joints 33 of the positioner 30 and the arm base 40 are configured similar to the control signals transmitted from the arm controller. On startup, all the brakes BRK of the arm base 40, the arm 51 and the translation mechanism 54 are turned off but the servomotors SM are driven to keep postures of the robot arm 50 and the arm base 40 against gravity. If an error occurs in the robotic surgical system 500, the brakes BRK included in the arm base 40, the arm 51 and the translation mechanism 54 are turned on. When the error in the robotic surgical system 500 is reset, the brakes BRK included in the arm base 40, the arm 51 and the translation mechanism 54 are turned off. When shutdown operation is performed in the robotic surgical system 500, the brakes BRK included in the arm base 40, the arm 51 and the translation mechanism 54 are turned on. The brakes BRK of the front wheels of the medical cart 10 are constantly turned on, and the brakes BRK are deactivated only when the enable switch 23b of the cart positioner operation unit 20 is kept pressed. Also, the brakes BRK of the joints 33 of the positioner 30 are constantly turned on, and the brakes BRK are deactivated only when the enable switch 22c of the cart positioner operation unit 20 is kept pressed.

As shown in FIG. 10, the first controller 310 is configured to control the robot arm 50 in accordance with manual operations received by the arm operation unit 60. For example, the first controller 310 is configured to control the robot arm 50 in accordance with manual operations received by the joystick 62 of the arm operation unit 60. Specifically, the arm controller 320 provides an input signal provided from the joystick 62 to the first controller 310. The first controller 310 generates position commands based on the received input signal and the rotation angles detected by the encoders EN1, and provides the position commands to the servo controllers SC1 via the arm controller 320. The servo controllers SC1 generate current commands based on the position commands provided from the arm controller 320 and the rotation angles detected by the encoders EN1, and provide the current commands to the servomotors SM1. Accordingly, the robot arm 50 is moved in accordance with an operation command provided to the joystick 62.

The first controller 310 controls the robot arm 50 based on an input signal from the linear switch 63 of the arm operation unit 60. Specifically, the arm controller 320 provides an input signal provided from the linear switch 63 to the first controller 310. The first controller 310 generates position commands based on the received input signal and the rotation angles detected by the encoder EN1 or EN3, and provides the position commands to the servo controller SC1 or SC3 via the arm controller 320. The servo controller SC1 or SC3 generate current commands based on the position commands provided from the arm controller 320 and the rotation angles detected by the encoder EN1 or EN3, and provide the current commands to the servomotor SM1 or SM3. Accordingly, the robot arm 50 is moved in accordance with an operation command provided to the linear switch 63.

The medical cart 10 includes the positioner controller 330. The positioner controller 330 is configured to control the positioner 30 and the medical cart 10. The positioner 30 includes a plurality of servomotors SM4, a plurality of encoders EN4 and a plurality of speed reducers corresponding to a plurality of joints 33 of the positioner 30. The medical cart 10 includes the servo controllers SC4 configured to control the servomotors SM4 of the positioner 30. The medical cart 10 includes servomotors SM5 and SM6 configured to drive the front wheels of the medical cart 10, the encoders EN5 and EN6, speed reducers, the servo controllers SC5 and SC6, and brakes BRK.

The operation controllers 340 are provided in a main body of the remote control apparatus 200. The operation controllers 340 are configured to control the operation units 110. The operation controller 340 is associated with both to correspond to the left-hand side operation unit 110L and the right-hand side operation unit 110R. The operation unit 110 includes servomotors SM, encoders EN and speed reducers corresponding to the plurality of joints of the operation unit 110. The servo controllers SC configured to control the servomotors SM of the operation unit 110 is provided in the main body of the remote control apparatus 200 adjacent to the operation controllers 340.

As shown in FIG. 10, the vision unit 300 and the image processing unit 400 are connected to the first controller 310 through LAN. The display 220 is connected to the vision unit 300.

(Setting of Pivot Position)

Figure 13:
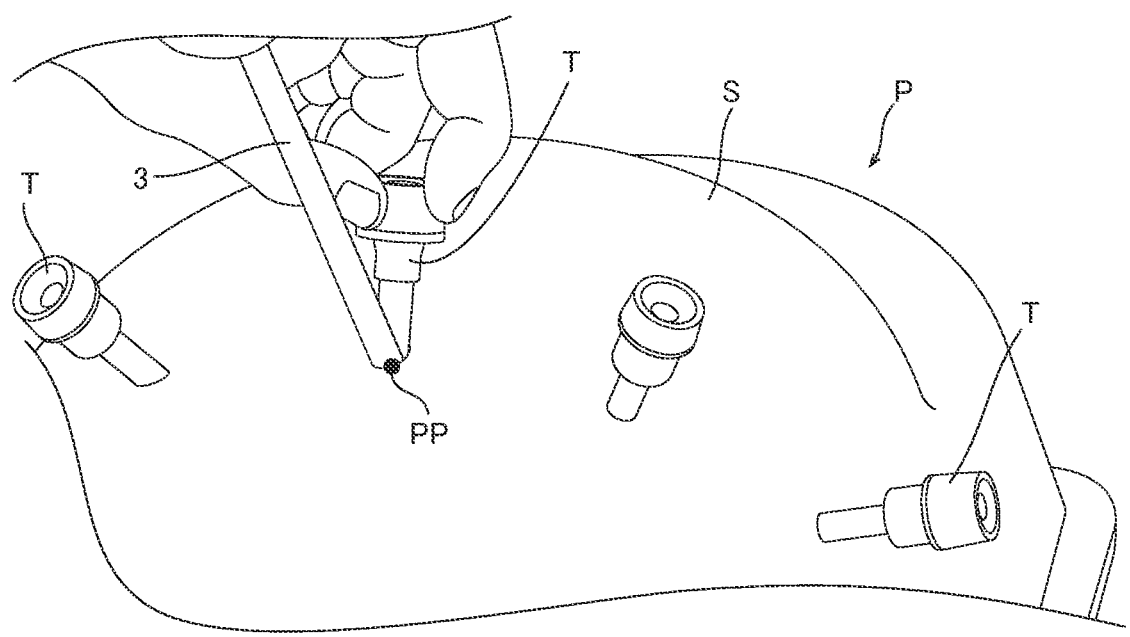
FIG. 13 is a view illustrating work of storing a pivot position into a storage.

Setting of the pivot position PP is now described. As shown in FIG. 13, the operator first moves the robot arm 50 by operating the arm operation unit 60 to move the distal part of the endoscope 3 shown in FIG. 14 or the pivot-position setting tool 4 shown in FIG. 15, which is attached to the distal part side of the robot arm 50, to a position corresponding to an insertion position of the trocar T inserted through a body surface S into a body of a patient P, and then operates the pivot button 66 so that the second controller 350 stores the pivot position PP into the storage 351. The pivot position PP is stored as one set of coordinates, and the setting of the pivot position PP does not specify a direction of the surgical instrument 1. Operating the pivot button 66 means pressing the pivot button 66.

(Changing of Pivot Position)

Figure 16:
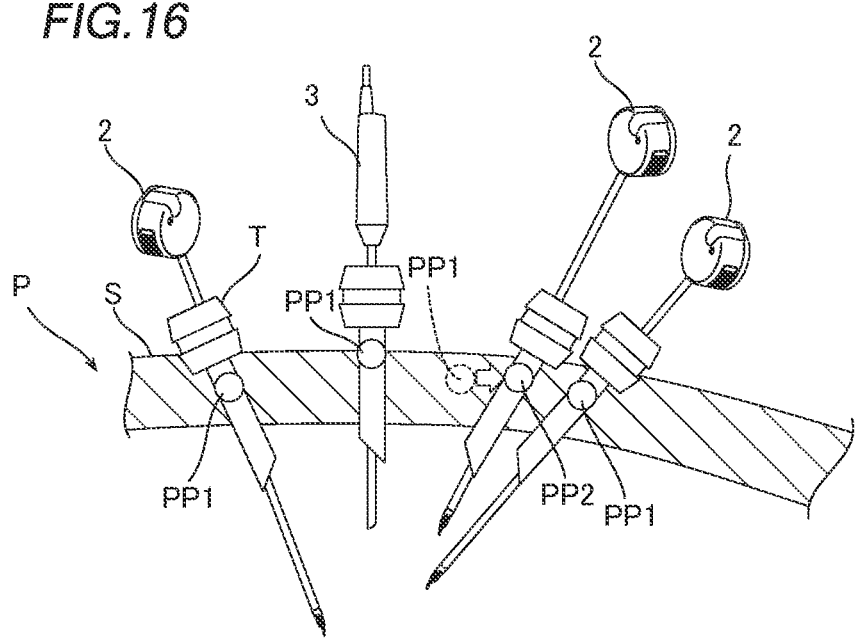
FIG. 16 is a view illustrating change of the pivot position stored in the storage.

In the following description, a first pivot position PP1 is the pivot position PP that is stored in storage 351 by the second controller 350 as the position corresponding to the insertion position of the trocar T to which the distal part of the endoscope 3 or the pivot-position setting tool 4 is moved. In this embodiment, when the pivot button 66 is consecutively operated twice, the first controller 310 confirms whether predetermined conditions are satisfied and switches to a pivot position change mode of changing the first pivot position PP1 stored in the storage 351 as shown in FIG. 16 if the predetermined conditions are satisfied. After the switching to the pivot position change mode, if the surgical instrument 1 is moved by at least one of joystick 62 and linear switch 63, and the pivot button 66 is then operated following to movement, the second controller 350 stores a position corresponding to the moved surgical instrument 1 into the storage 351 as a second pivot position PP2 corresponding to the changed position. The first pivot position PP1 can be changed corresponding to each of the robot arm 50 to which the endoscope 3 is attached, and the robot arm 50 to which the instrument 2 is attached. The switching to the pivot position change mode will be described later.

Figure 17:
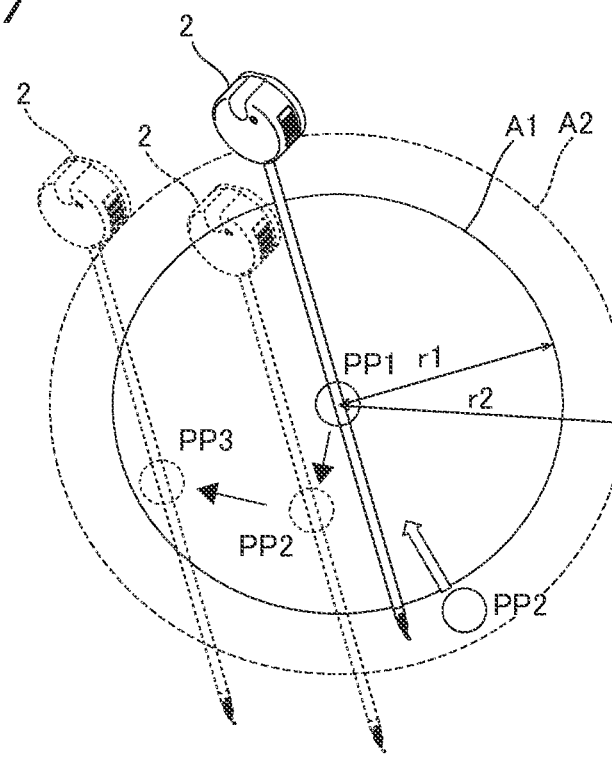
FIG. 17 is a diagram illustrating a pivot correctable range and a pivot-correction start available range.

As shown in FIG. 17, the second controller 350 accepts change of the first pivot position PP1 into a pivot correctable range A1 specified based on the first pivot position PP1 stored in the storage 351. The pivot correctable range A1 is a range inside a sphere that has a radius r1 and centers at the first pivot position PP1 stored in the storage 351, and is calculated by the first controller 310. After the second pivot position PP2 is stored in the storage 351, if the first controller switches to the pivot position change mode, the second controller 350 stores a position corresponding to the moved surgical instrument 1 that is included in the pivot correctable range A1 specified based on the first pivot position PP1 as a third pivot position PP3. That is, even if the first pivot position PP1 is changed, and the second pivot position PP2 is further changed, the pivot correctable range A1 is still the range, which has a radius r1 and centers at the first pivot position PP1, which is firstly stored in the storage 351. The radius r1 is set at a value in a range not smaller than 20 mm and not greater than 40 mm in consideration of a force applied by the surgical instrument 1 to an abdominal wall of the patient P and the advice from doctors. For example, the radius r1 is set at 30 mm.

The first controller 310 does not accept switching to the pivot position change mode if a current position of the second pivot position PP2 is outside a pivot-correction start available range A2, which is greater than the pivot correctable range A1. The pivot-correction start available range A2 is specified to allow pivot correction even if the current position of the second pivot position PP2 is actually brought outside the pivot correctable range A1 by bending the surgical instrument 1 by an external force that is applied to the surgical instrument 1 while the second pivot point PP2 stored in storage 351 is located in the pivot correctable range A1. The pivot-correction start available range A2 is a range inside a sphere that has a radius r2 and centers at the first pivot position PP1 stored in the storage 351. The radius r2 is greater than the radius r1. The radius r2 is set at a value in a range not smaller than 25 mm and not greater than 45 mm, which is obtained by adding a positional tolerance of the pivot position PP to the radius r1, which is the maximum value of the pivot correctable range. For example, the radius r2 is set at 35 mm. The second controller 350 monitors whether the second pivot position PP2 is outside the pivot-correction start available range A2. If the second pivot position PP2 is outside the pivot-correction start available range A2, the second controller 350 informs the first controller 310 that the second pivot position PP2 is outside the pivot-correction start available range A2.

If the current position of the second pivot position PP2 is positioned between the pivot-correction start available range A2 and the pivot correctable range A1, the second controller 350 accepts an operating input by the arm operation unit 60 to move the surgical instrument 1 only in a direction toward the first pivot position PP1. Such an acceptable operating input includes not only an operating input to linearly move the surgical instrument in a direction toward the first pivot position PP1 but also an operating input to move the surgical instrument 1 along a curve toward the of the first pivot point PP1. If the surgical instrument 1 is directed to move away from the first pivot position PP1, the first controller 310 displays a warning message on the monitor 140 of the remote control apparatus 200, and produces an audible alarm.

Figure 20:
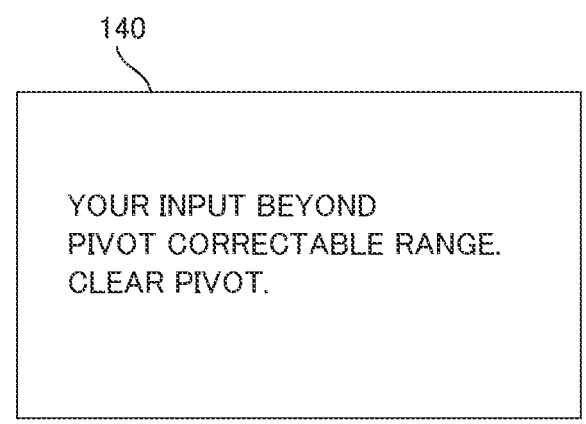
FIG. 20 is a view illustrating a message displayed on a monitor if the pivot position is located outside the pivot-correction start available range.

If the current position of the second pivot position PP2 is outside the pivot-correction start available range A2, the first controller 310 displays a message indicating that the current position is outside the pivot-correction start available range A2 on the monitor 140 of the remote control apparatus 200, as shown in FIG. 20. For example, the monitor 140 displays a message "Your Input Beyond Pivot Correctable Range; Clear Pivot".

Figure 21:
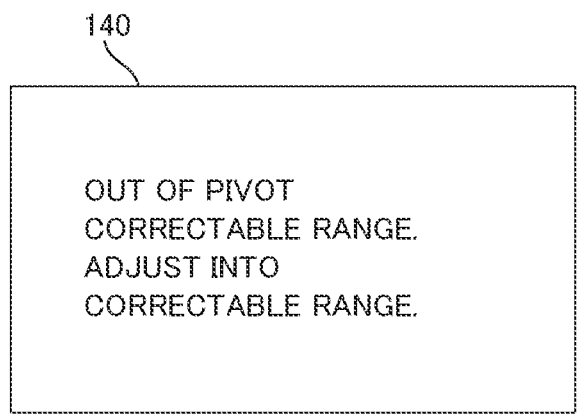
FIG. 21 is a view illustrating a message displayed on the monitor if the pivot position is located between the pivot correctable range and the pivot-correction start available range.

If the current position of the second pivot position PP2 is positioned between the pivot correctable range A1 and the pivot-correction start available range A2, when the pivot button 66 is pressed to set the second pivot position PP2, the first controller 310 directs the monitor 140 to display a message that urges the operator to adjust the second pivot position PP2 into the pivot correctable range A1, as shown in FIG. 21. For example, the monitor 140 displays a message "Out of Pivot Correctable Range; Adjust Into Correctable Range".

Figure 18:
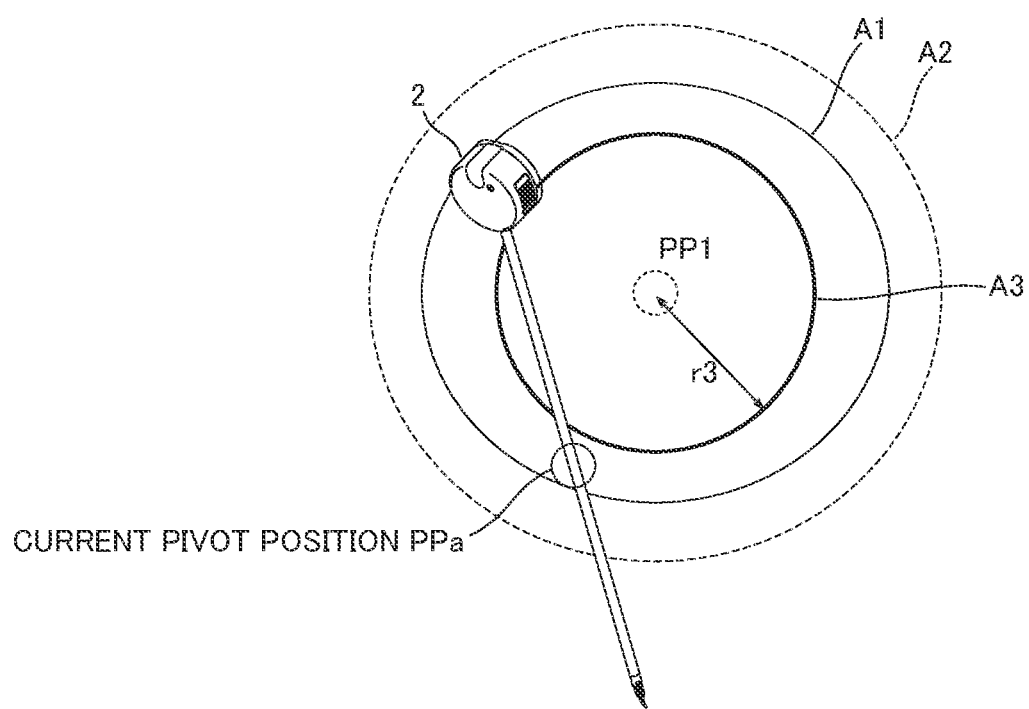
FIG. 18 is a diagram illustrating a pivot displacement monitoring range before the pivot position is changed.
Figure 23:
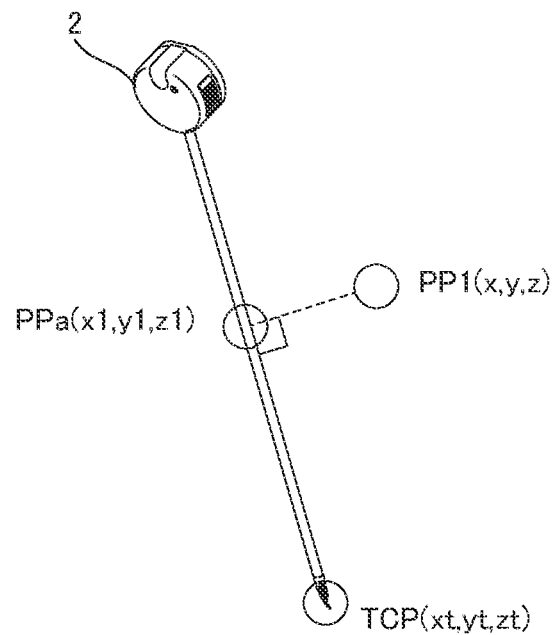
FIG. 23 is a diagram illustrating calculation of a temporary pivot position.

If a displacement between a current pivot position PPa on the surgical instrument 1 and the first pivot position PP1 is out of a pivot displacement monitoring range A3 as shown in FIG. 18, the second controller 350 displays anomaly on the monitor 140. The second controller 350 monitors whether a displacement between the current pivot position PPa on the surgical instrument 1 and the first pivot position PP1 is within the pivot displacement monitoring range A3. If the displacement between the surgical instrument 1 and the first pivot position PP1 is out of the pivot displacement monitoring range A3, the second controller 350 informs the first controller 310 that the displacement between the surgical instrument 1 and the first pivot position PP1 is out of the pivot displacement monitoring range A3. The pivot displacement monitoring range A3 is a range inside a sphere that has a radius r3. The radius r3 is set at a value in a range not smaller than 10 mm and not greater than 30 mm in consideration of the radius r1. For example, the radius r3 is set at 20 mm. The current pivot position PPa on the surgical instrument 1 is an intersection of the normal to the shaft 2c of the instrument 2 or the shaft 3c of the endoscope 3 extending from the first pivot position PP1 stored in storage 351 as shown in FIG. 23 and the shaft 2c or the shaft 3c. The current pivot position PPa is also calculated from detection values of the encoder EN4 arranged in the positioner 30, and the encoders EN1 and EN3 arranged in the robot arm 50. The current pivot position PPa refers to the pivot position PPa during changing.

In a normal mode, if the displacement between a current pivot position PPa and the first pivot position PP1 is out of the pivot displacement monitoring range A3 as shown in FIG. 18, the second controller 350 informs anomaly. The normal mode is a mode returned from the pivot position change mode. Although the pivot correctable range A1, the pivot-correction start available range A2, and the pivot displacement monitoring range A3 are shown in FIG. 18, the pivot correctable range A1 and pivot displacement monitoring range A3 are used as two parameters in terms of control in the normal mode. If the first controller switches to the pivot position change mode, the pivot correctable range A1 and the pivot-correction start available range A2 are used as two parameters in terms of control. The pivot-correction start available range A2 and pivot displacement monitoring range A3 are defined by the same parameters in terms of control. The radius r1 of the pivot correctable range A1 and the radius r2 of the pivot-correction start available range A2 are greater than the radius r3 of the pivot displacement monitoring range A3.

Figure 19:
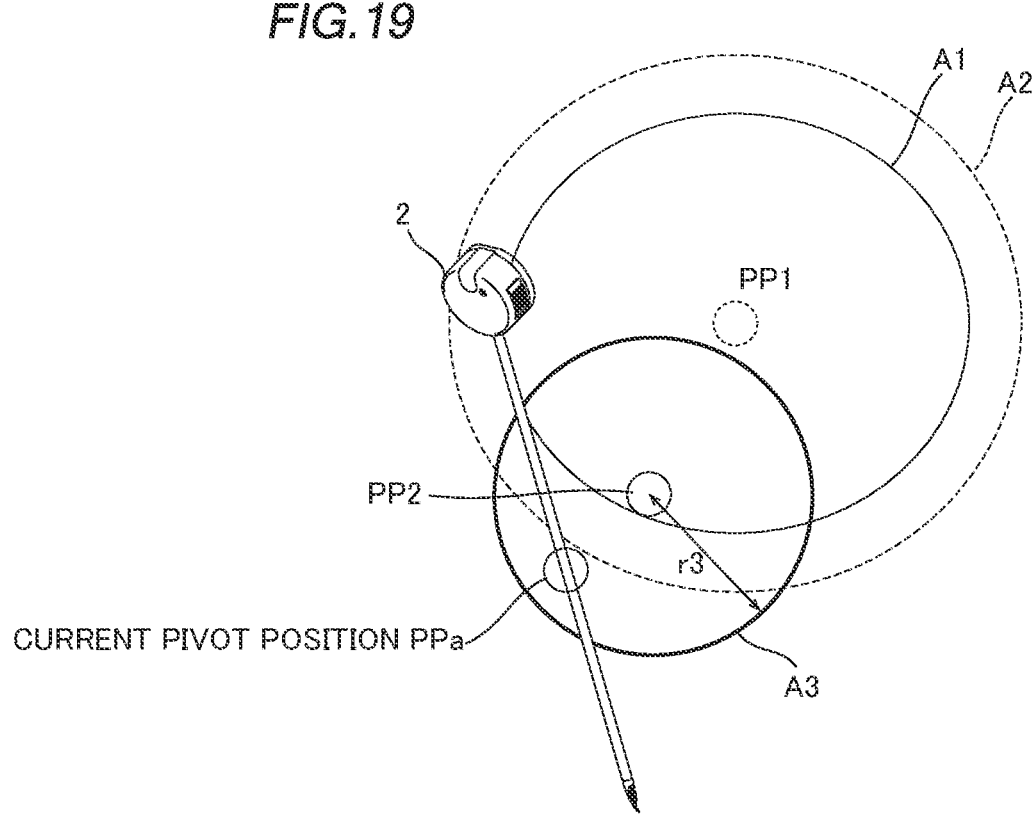
FIG. 19 is a diagram illustrating a pivot displacement monitoring range after the pivot position is changed.

Also, as shown in FIG. 19, after the first pivot position PP1 stored in the storage 351 is changed to the second pivot position PP2, the pivot displacement monitoring range A3 is changed to a pivot displacement monitoring range A3 that has the radius r3 and centers at the second pivot position PP2. Because the current pivot position PPa is within the pivot displacement monitoring range A3 in FIG. 19, no abnormality is informed.

Figure 22:
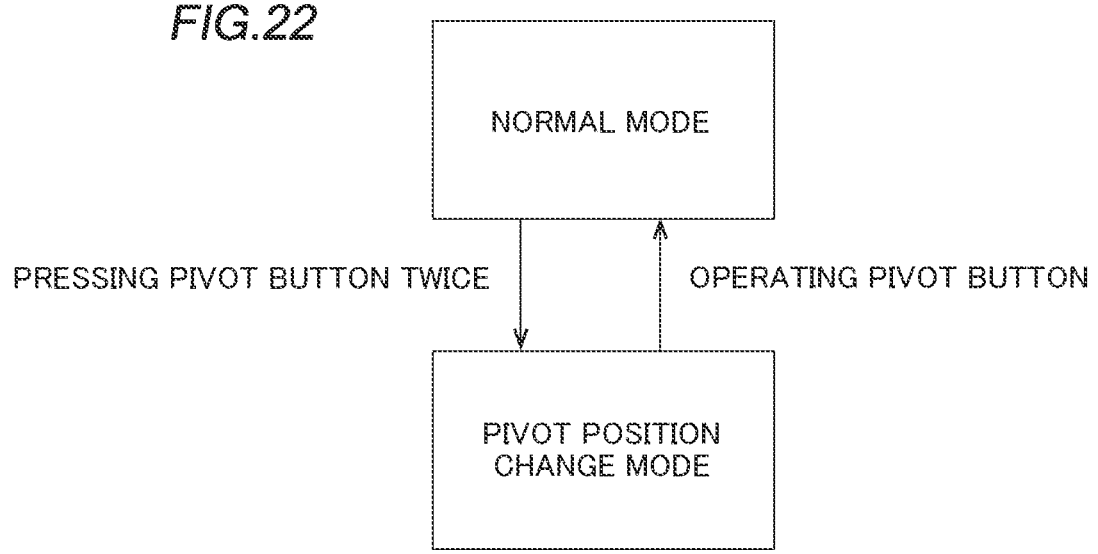
FIG. 22 is a diagram illustrating change between modes.

The switching to the pivot position change mode is now described with reference to FIG. 22. When the pivot button 66 is pressed twice by the operator, the first controller 310 determines whether the following conditions 1 to 3 are satisfied. The condition 1 is that the pivot button 66 is pressed twice. The condition 2 is that following is not executed or a moving speed of the surgical instrument 1 is not greater than a predetermined speed if in the following. The condition 3 is that the current pivot position PP is within the pivot-correction start available range A2, which is larger than the pivot-correction start available range A1 specified based on the first pivot position PP1 stored in the storage 351.

In the condition 1, that the pivot button 66 is pressed twice means that the pivot button 66 is consecutively pressed twice within a predetermined time period. In the condition 2, the following means an operating input of the surgical instrument 1 by the operator by using the arm operation unit 60 of the remote control apparatus 200. The following description describes the condition 3. The current pivot position PPa can be displaced from the first pivot position PP1 stored in the storage 351 when the operator sharply operates the operation unit 110. Also, the current pivot position PPa can be displaced from the first pivot position PP1 by body motion of the patient P. The condition 3 is that the current pivot position PPa is within the pivot-correction start available range A2. As discussed above, the current pivot position PPa is an intersection of the normal to the shaft 2c of the instrument 2 or the shaft 3c of the endoscope 3 extending from the first pivot position PP1 stored in storage 351 as shown in FIG. 23 and the shaft 2c or the shaft 3c.

If determining that the conditions 1 to 3 are satisfied, the first controller 310 sends a pivot position correction switch enable signal ON to the second controller 350. The second controller 350 receives the pivot position correction switch enable signal ON. Subsequently, the second controller 350 determines whether the condition 1 and the following conditions 4 to 7 are satisfied. The condition 4 is that the first pivot position PP1 has been stored. The condition 5 is that a position of the robot arm 50 is not moving to a replacement position in order to replace the endoscope 3. The condition 6 is that a position of the robot arm 50 is not moving to a replacement position in order to replace the instrument 2. The condition 7 is that the enable switch 61 is not operated.

In the conditions 5 and 6, a position of the robot arm 50 moves to a replacement position in order to replace the instrument 2 or the endoscope 3 refers to that the robot arm 50 moves by a predetermined distance from a position of the robot arm 50 before the replacement toward the near side to reinsert the instrument 2 or the endoscope 3 into the patient P after the instrument 2 or the endoscope 3 are replaced. This work is referred to as guide tool change. In the condition 7, that the enable switch 61 is operated refers to that the enable switch 61 is pressed.

If determining that the condition 1 and the conditions 4 to 7 are satisfied, the second controller 350 sends the pivot position correction switch enable signal ON to the first controller 310. The first controller 310 receives the pivot position correction switch enable signal ON, and switches into the pivot position change mode if determining that the conditions 2 to 7 are satisfied.

The first controller 310 displays a message "Under Pivot Correction; Press Pivot Button When Pivot Correction Is Completed" on the monitor 140 of the remote control apparatus 200 in the pivot position change mode. In the pivot position change mode, if the first pivot position PP1 is being corrected to a position beyond the pivot correctable range A1, the first controller 310 directs the monitor 140 to display a message "At Limit of Pivot Correctable Range". If the pivot button 66 is pressed in the pivot reposition mode, the first controller 310 return the mode to the normal mode. Also, if the robotic surgical system 500 reboots, or if the surgical instrument 1 is detached from the patient P, the first controller 310 return the mode to the normal mode.

(Calculation of Pivot Position)

Calculation of the pivot position PP is now described. Although the following describes calculation in a case where in which the first pivot position PP1 stored in the storage 351 is displaced from the first pivot position PP1 on the actual surgical instrument 1, this calculation is the same as a case in which the first pivot position PP1 is not displaced from the first pivot position PP1. As shown in FIG. 23, coordinates of the first pivot position PP1 stored in the storage 351 are represented by (x, y, z) The center of a crevice of the surgical instrument 1 is referred to as TCP.

When the mode changes to the pivot position change mode, the second controller 350 specifies an intersection of the normal to the shaft 2c of the surgical instrument 1 extending the first pivot position PP1 stored in the storage 351 and the shaft 2c as a temporary pivot position PPa. Coordinates (x1, y1, z1) of the temporary pivot position PPa are stored in the storage 351. Also, the mode changes to the pivot position change mode, the second controller 350 sets a position of the TCP based on an orientation of the surgical robot 100 calculated in accordance with values of encoders arranged in axes of the positioner 30 and the robot arm 50. Coordinates (xt, yt, zt) of TCP are stored in the storage 351.

Figure 24:
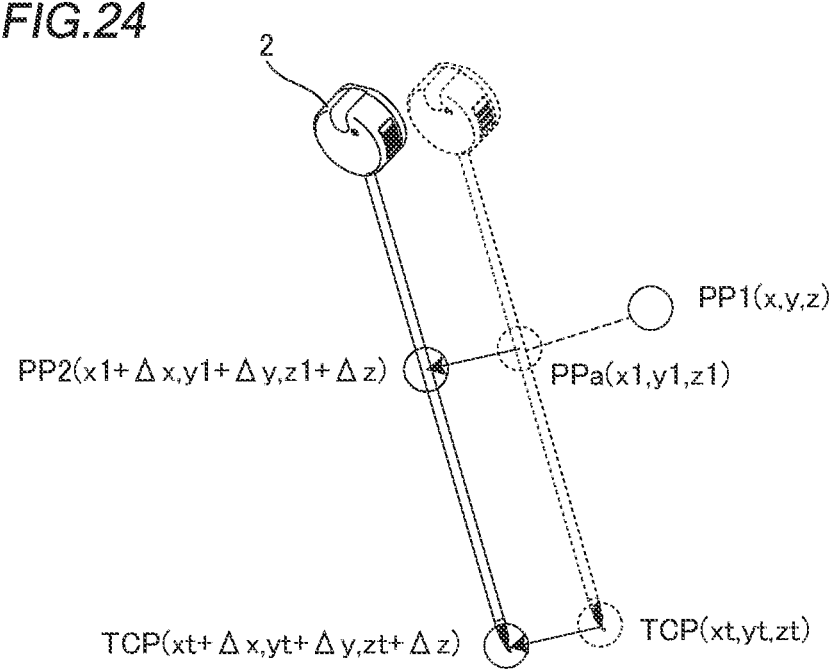
FIG. 24 is a diagram illustrating calculation of a pivot position after changed.

As shown in FIG. 24, when the first pivot position PP1 is moved by the joystick 62 or linear switch 63, the second controller 350 stores coordinates of TCP after the movement (xt+Δx, yt+Δy, zt+Δz) in the storage 351. Subsequently, amounts of the movement of TCP (Δx, Δy, Δz) are calculated. The second controller 350 stores the coordinates (x1+Δx, y1+Δy, z1+Δz), which are obtained by adding the calculated movement amounts (Δx, Δy, Δz) to the coordinates of the temporary pivot point PPa (x1, y1, z1) as the coordinates of the second pivot position PP2 after change in the storage 351. A line that connects the first pivot position PP1 before the movement and the TCP before the movement is parallel to a line that connects the second pivot position PP2 after the movement and the TCP after the movement.

(Graphical User Interface)

Figure 25:
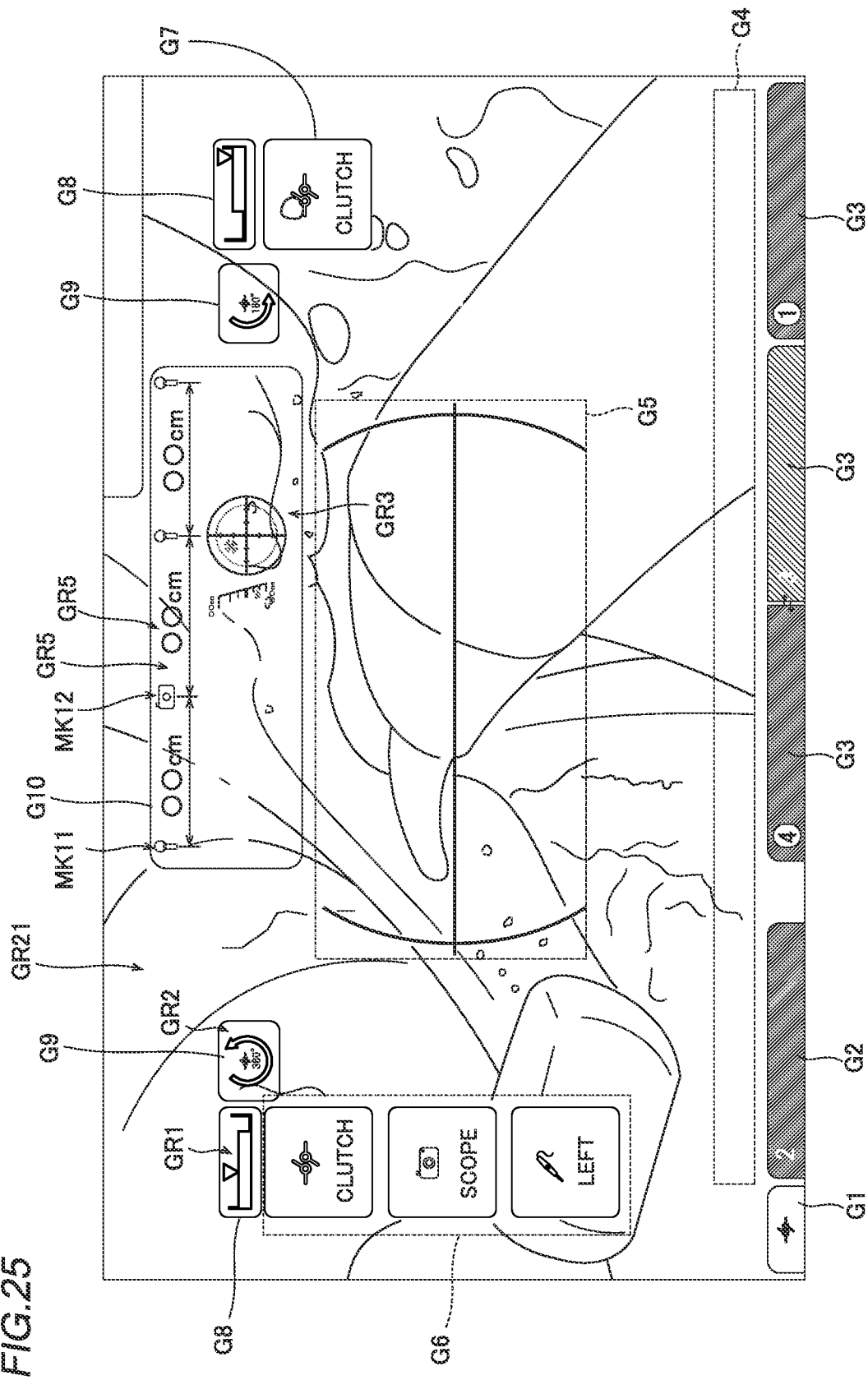
FIG. 25 is a view illustrating a graphical user interface superimposed on an image captured by the endoscope.

In this embodiment, as shown in FIG. 25, the vision unit 300 generates a graphical user interface G, and displays the graphical user interface G on the image GR21 captured by the endoscope 3 on the monitor 140 and the display 220. The vision unit 300 acquires the image GR21 from the endoscope 3. In addition, the vision unit 300 acquires information on movable ranges of the robot arms 50 from the arm controller 320, and information on current positions of the robot arms 50. In addition, the vision unit 300 acquires information on operational movable ranges of the operation unit 110 and information on current positions of the operation unit 110 from the remote control apparatus 200.

The graphical user interface G includes a clutch area G1. The clutch area G1 indicates a status of the clutch pedal 123. The graphical user interface G includes a camera area G2. The camera area G2 indicates a status of the camera pedal 124.

The graphical user interface G includes a hand area G3. The hand area G3 indicates statuses of the robot arms 50 and statuses of the coagulation pedal 126 and the incision pedal 125. The clutch area G1, the camera area G2, and the hand area G3 are displayed in lower parts of the monitor 140 and the display 220.

Graphical user interface G includes a medical instrument area G4. The medical instrument area G4 indicates current usage/maximum usage numbers of the surgical instruments 1 attached to the robot arms 50. If the current usage number reaches the maximum usage number, the current usage number is indicated in red. Also, if no surgical instrument 1 is attached to the robot arm 50, the medical instrument area G4 is blank. The medical instrument area G4 is located above the clutch area G1, the camera area G2, and the hand area G3 on the monitor 140 and the display 220.

The graphical user interface G includes a level area G5. The level area G5 indicates information on an angle of the endoscope 3. The level area G5 is displayed only while the camera pedal 124 is depressed.

The graphical user interface G includes a left pop-up area G6. The left pop-up area G6 indicates icons in a hovering position in which the foot of the operator is placed on the foot pedal 120.

The graphical user interface G includes a right pop-up area G7. The right pop-up area G7 indicates an icon when foots of the operator are placed on the coagulation pedal 126R and the incision pedal 125R. The right pop-up area G7 is indicated in a right prt of the monitor 140.

The graphical user interface G includes a first area G8 indicating a first graphical display GR1 indicating a movable range of the robot arm 50, an operational movable range that is allowed for the operation unit 110 to move the robot in movable range of the robot arm 50. The graphical user interface G also includes a second area G9 displaying a second graphical display GR2, which is different from the first area G8, indicating an operating input on the operation unit 110 that is required at least one of for returning the operation unit 110 into the operational movable range, and for returning the robot arm 50 to the movable range.

In this embodiment, the vision unit 300 is configured to direct the monitor 140 and the display 220 to superimpose the graphical user interface G including the correctable range indication GR3 indicating the pivot correctable range A1 that is specified based on the pivot position PP that is stored in the storage 351 on the image GR21, which is captured by the endoscope 3. Specifically, the first controller 310 changes into the pivot position change mode of changing the pivot position PP when the pivot button 66 is operated as described above.

Subsequently, the vision unit 300 directs the monitor 140 and the display 220 to superimpose the graphical user interface G including the correctable range indication GR3 on the image GR21, which is captured by the endoscope 3.

Figure 26:
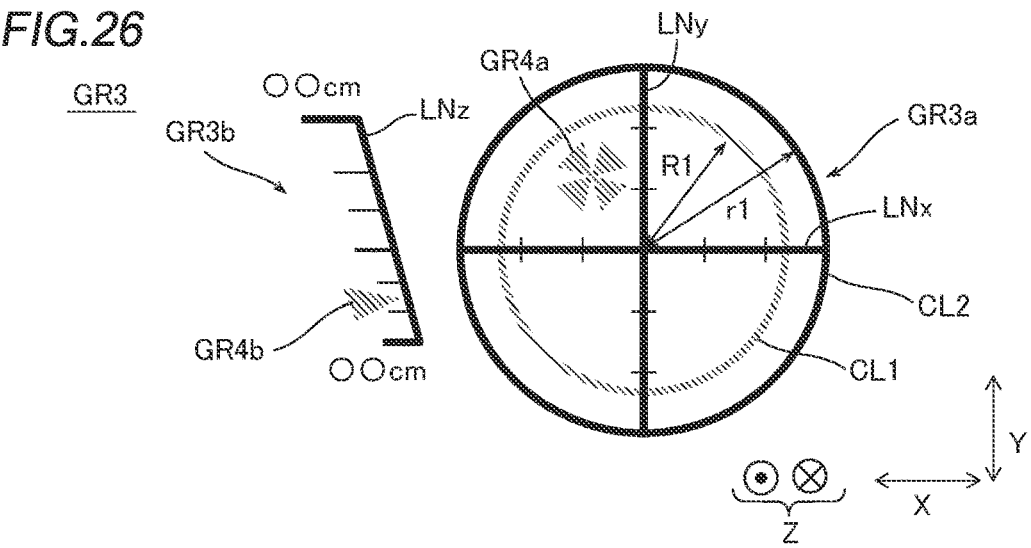
FIG. 26 is a view illustrating a correctable range indication when an enable switch is pressed.

In this embodiment, as shown in FIG. 26, the correctable range indication GR3 includes the first correctable range indication GR3a indicating the pivot correctable range A1 in a plane orthogonal to the shaft 1c of the surgical instrument 1. The plane orthogonal to the shaft 1c of surgical instrument 1 is the X-Y plane. The pivot correctable range A1 is represented by a sphere that has a radius r1, and centers at the pivot position PP. The first correctable range indication GR3a includes a first circle CL1 representing the pivot correctable range A1 in the X-Y plane orthogonal to the shaft 1c of the surgical instrument 1. The first circle CL1 represents an outer edge of the pivot correctable range A1 in the X-Y plane. The shaft 1c of the surgical instrument 1 refers to the shaft 2c of the instrument 2 or the shaft 3c of the endoscope 3.

In this embodiment, the diameter R1 of the first circle CL1 varies in accordance with the pivot position PP in a direction along the shaft 1c of the surgical instrument 1 during the changing of the pivot position. In other words, the coordinates of the pivot position PP (x, y, Z) in the XYZ coordinate system varies in accordance with movement of the surgical instrument 1 by at least one of joystick 62 and linear switch 63, after the mode changes into the pivot position change mode. Because the pivot correctable range A1 is represented by the sphere, which has a radius r1, and centers at the pivot position PP, a size of the pivot correctable range A1 in the X-Y plane is changed by increasing/decreasing the value z corresponding to the Z axis of the pivot position PP. The diameter R1 of the first circle CL1 varies in accordance with the value z corresponding the Z-axis of the pivot position PP. If the value z is 0, the diameter R1 of the first circle CL1 agrees with the radius r1 of the pivot correctable range A1.

In this embodiment, the first correctable range indication GR3a includes a second circle CL2 that represents the largest area of the pivot correctable range A1, and has a fixed diameter r1 irrespective of the pivot position PP in the direction along the shaft 1c during the changing of the pivot position. If the value z is 0, the first circle CL1 and the second circle CL2 overlap each other. In addition, the correctable range indication GR3 includes a line LNx representing the X-axis and a line LNy representing the Y-axis.

Figure 27:
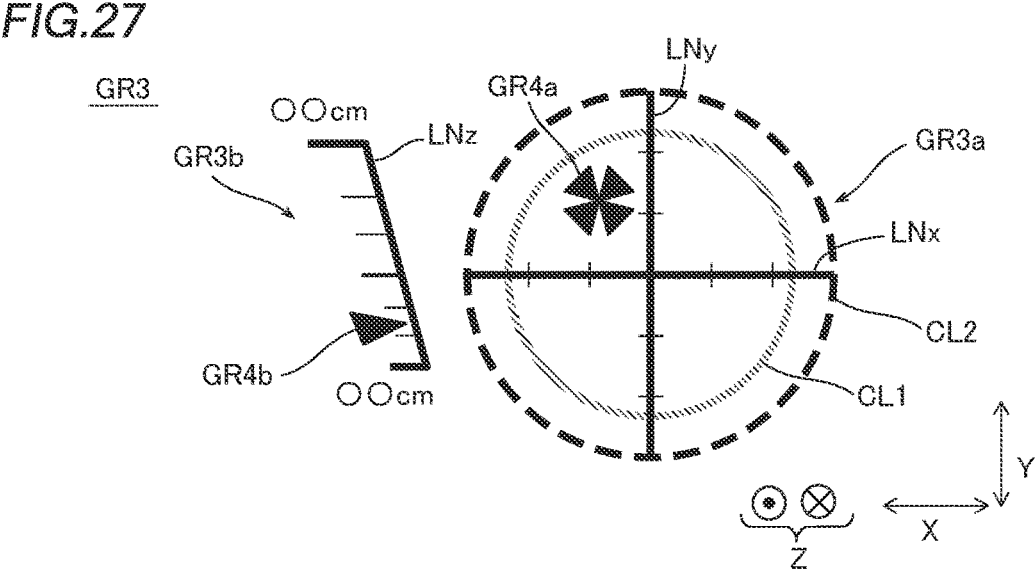
FIG. 27 is a view illustrating the correctable range indication in a case in which no surgical instrument is attached to the robot arm.

In this embodiment, an indication form of the second circle CL2 when the surgical instrument 1 is attached to the robot arm 50 is different from an indication form of the second circle CL2 when the surgical instrument 1 is not attached to the robot arm 50. For example, when the surgical instrument 1 is attached to the robot arm 50, the second circle CL2 is indicated by a solid line as shown in FIG. 26. For example, when the surgical instrument 1 is attached to the robot arm 50, the second circle CL2 is indicated by a dotted line as shown in FIG. 27.

In this embodiment, the correctable range indication GR3 includes a linear second correctable range indication GR3b indicating the pivot correctable range A1 in the direction along the shaft 1c of the surgical instrument 1, as shown in FIG. 26. For example, the second correctable range indication GR3b includes a line LNZ representing the Z axis.

Figure 28:
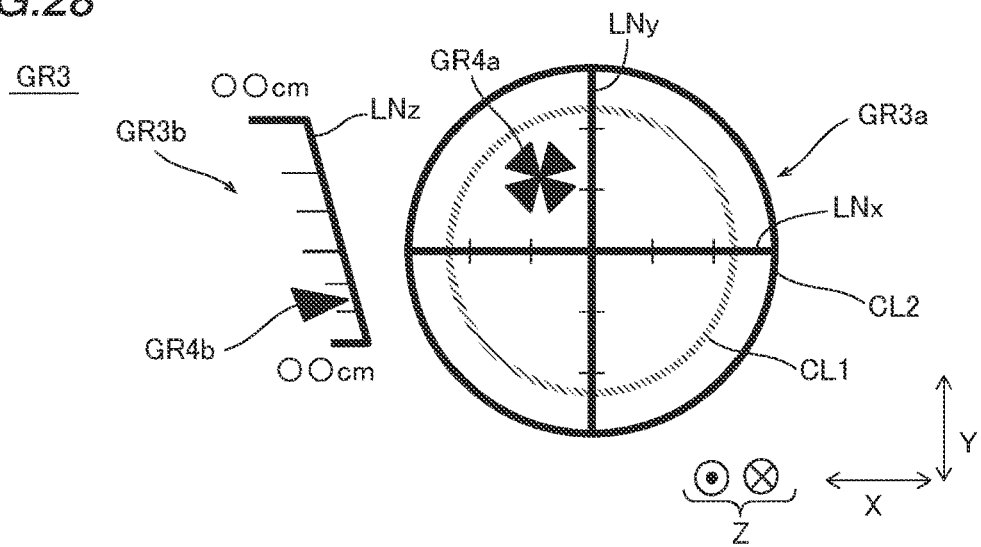
FIG. 28 is a view illustrating a first changing-position indication and a second changing-position indication when the enable switch is not pressed.

In this embodiment, the vision unit 300 is configured to direct the monitor 140 and display 220 to display the image GR21, which is captured by the endoscope 3, with the graphical user interface G including the correctable range indication a first changing-position indication GR4a that indicates a pivot position PP in a plane orthogonal to the shaft 1c of the surgical instrument 1 during the changing of the pivot position, and a second changing-position indication GR4b that indicates the pivot position PP in a direction along the shaft 1c. For example, the first changing-position indication GR4a is a cross symbol indicated inside the first circle CL1. For example, the second changing position indication GR4b is a triangle symbol corresponding to the value z of the Z-axis of the pivot position PP indicated beside the second correctable range indication GR3b. The cross symbol and the triangle symbol move according to the coordinates (x, y, z) of the pivot point PP during the changing of the pivot position, In this embodiment, indication forms of the first and second changing-position indications GR4a and GR4b in a case in which the enable switch 61 enables the movement of the robot arm 50 are different from indication forms of the first and second changing-position indications GR4a and GR4b in a case in which the enable switch 61 disables the movement of the robot arm 50. For example, if the enable switch 61 is pressed by the operator so that movement of the robot arm 50 is enabled, the first and second changing-position indications GR4a and GR4b are in blue as shown in FIG. 26. Here, blue is represented by hatching in FIG. 26. For example, if the enable switch 61 is not pressed by the operator so that movement of the robot arm 50 is disabled, the first and second changing-position indications GR4a and GR4b are in white as shown in FIG. 28. Here, blue is represented by solid black in FIG. 26.

In this embodiment, the vision unit 300 directs the monitor 140 and the display 220 to superimpose the graphical user interface G including the correctable range indication GR3 corresponding to one robot arm 50 during the changing of the pivot position in the robot arm 50a, 50b, 50c and 50d on the image GR21, which is captured by the endoscope 3 as shown in FIG. 25. For example, the vision unit 300 is configured to indicate a mark MK11 indicating the robot arm 50 corresponding to the endoscope 3, and a mark MK12 corresponding to the instrument 2 on the monitor 140 and the display 220. In FIG. 25, the correctable range indication GR3 is indicated below the mark MK12 of the robot arm 50 to which the instrument 2 during the changing of the pivot position is attached.

In this embodiment, as shown in FIG. 25, the vision unit 300 is configured to direct the monitor 140 and the display 220 to display the image GR21, which is captured by the endoscope 3, with the graphical user interface G including a pivot-to-pivot distance indication GR5 indicating distances between pivot positions PP that are pivot points of movement of the surgical instruments 1 attached to the robot arms 50a, 50b, 50c and 50d superimposed on the image. The distances between the pivot positions PP of the robot arms 50a, 50b, 50c and 50d are indicated between the marks MK11 and MK12, or between the marks MK11 as dimensions in cm, for example. The distance between the pivot position PP is indicated from the setting of the pivot position PP to the following movement. The following movement is movement of the robot arm 50 by the operator by operating the operation unit 110. The distances between the pivot positions PP are not indicated while the enable switch 61 of the arm operation unit 60 is pressed. The correctable range indication GR3 of the robot arm 50 during the changing of the pivot position is indicated below the pivot-to-pivot distance indication GR5. The correctable range indication GR3, the first and second changing-position indications GR4a and GR4b, and the pivot distance display GR5 are indicated in an area G10 of graphical user interface G.

Figure 29:
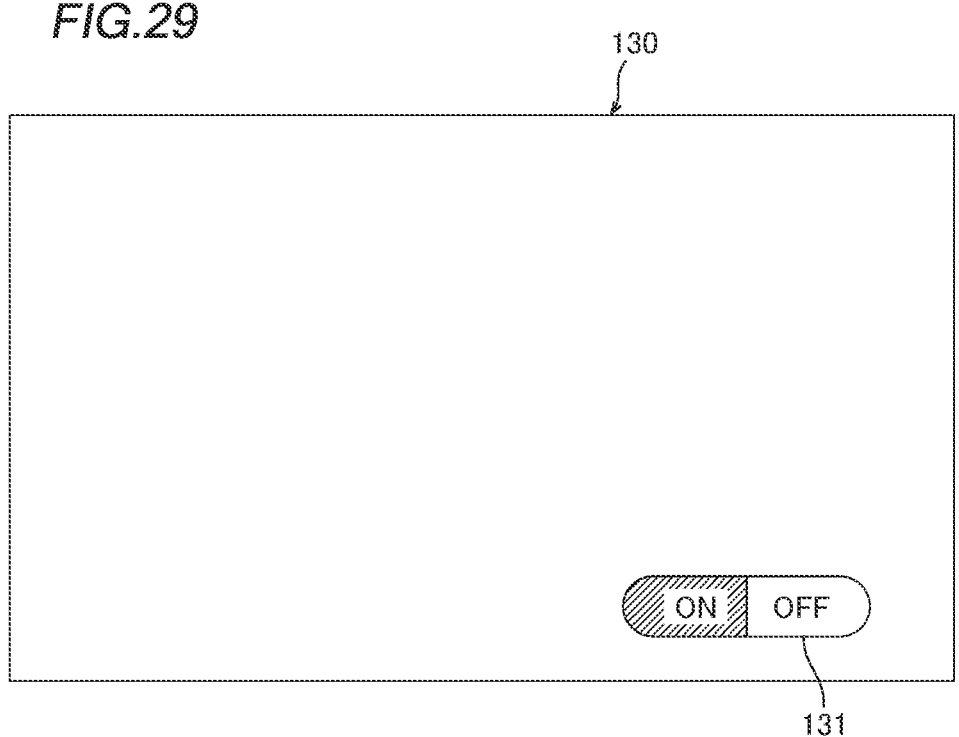
FIG. 29 is a view illustrating a switch for switching between ON and OFF of a pivot-to-pivot distance indication.
Figure 30:
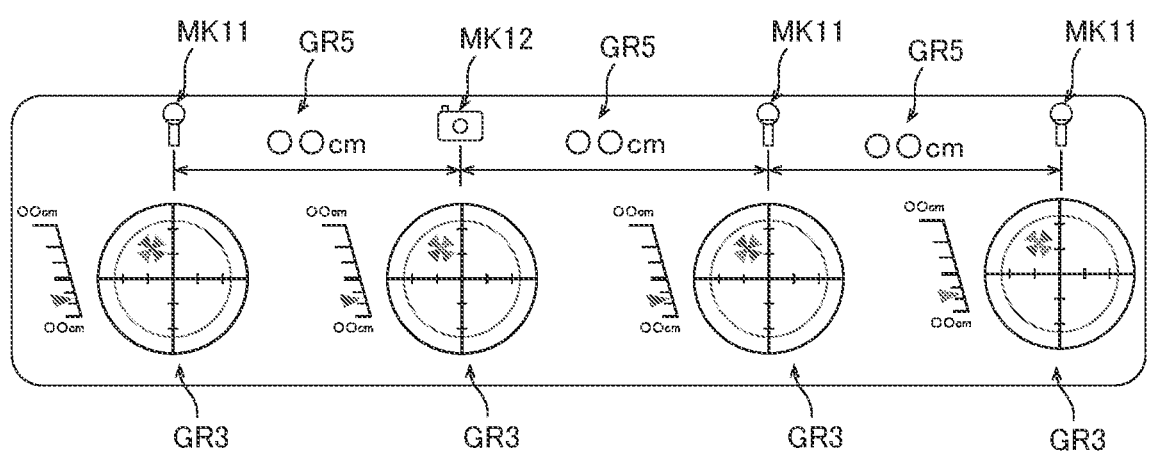
FIG. 30 is a view illustrating the correctable range indication when the pivot-to-pivot distance indication is turned ON by the switch.

In this embodiment, as shown in FIG. 29, the robotic surgical system 500 includes a switch 131 configured to accept selection whether the pivot-to-pivot distance indication GR5 is displayed on the monitor 140 and the display 220. As shown in FIG. 30, the vision unit 300 directs the monitor 140 and the display 220 to superimpose the graphical user interface G including the correctable range indications GR3 corresponding to all the robot arms 50a, 50b, 50c and 50d on the image GR21, which is captured by the endoscope 3 if the switch 131 accepts an operating input for displaying the pivot-to-pivot distance indication GR5 on the monitor 140 and the display 220. For example, the switch 131 is a button displayed on the touch panel 130 of the remote control apparatus 200.

In this embodiment, the robotic surgical system 500 includes the enable switch 61 and the adjustment button 67, which are configured to accept an operating input for returning the pivot position PP that has been changed to the position before the changing of the pivot position PP. The second controller 350 is configured to return the pivot position PP that is stored in the storage 351 after the changing of the pivot position to the pivot position PP before the changing of the pivot position in response to the operating input for returning accepted by operating the enable switch 61 and the adjustment button 67. Specifically, if the operator presses both the enable switch 61 and the adjustment button 67, the second controller 350 returns the pivot position PP that is stored in the storage 351 after the changing of the pivot position to the pivot position PP before the changing of the pivot position. The second controller 350 is an example of a controller. The operating input for returning the changed pivot position PP to the pivot position PP before the changing of the pivot position can be accepted only in the pivot position change mode.

(Robotic-Surgical-System Control Method)

The following description describes a method of controlling the robotic surgical system 500. As shown in FIG. 31, in step S1, the operator first moves the robot arm 50 by operating the arm operation unit 60 to move the distal part of the endoscope 3 or the pivot-position setting tool 4, which is attached to the distal part side of the robot arm 50, to a position corresponding to an insertion position of the trocar T inserted through a body surface S into a body of a patient P, and then operates the pivot button 66 so that the second controller 350 stores the first pivot position PP1 into the storage 351.

In step S2, the surgical instrument 1 is moved to perform surgery on the patient P by using the operation unit 110 of the remote control apparatus 200. The abdominal wall of the patient P is pulled by the trocar T when the body of the patient P is displaced in surgery in some cases. Also, interference of robot arms 50 with each other can be avoided or a movable range of the surgical instrument 1 inside the patient P can be expanded by changing the pivot position PP in some cases. In such a case, the operator presses the pivot button 66 twice.

When a signal produced by the two presses of the pivot button 66, the first controller 310 sends the pivot position correction switch enable signal ON to the second controller 350 if determining that the conditions 1 to 3 are satisfied in step S3. If determining that the condition 1 and the conditions 4 to 7 are satisfied, the second controller 350 sends the pivot position correction switch enable signal ON to the first controller 310. The first controller 310 receives the pivot position correction switch enable signal ON, and switches into the pivot position change mode if determining that the conditions 2 to 7 are satisfied.

In step S4, the first controller 310 determines whether the surgical instrument 1 is attached to the robot arm 50.

If yes in step S4, the vision unit 300 directs the monitor 140 and the display 220 to superimpose the graphical user interface G including the correctable range indication GR3 indicating the pivot correctable range A1 that is specified based on the pivot position PP that is stored in the storage 351 on the image, which is captured by the endoscope 3, in step S5. Also, even if the first pivot position PP1 is changed, and the second pivot position PP2 is further changed, the pivot correctable range A1 is still the range, which has a radius r1 and centers at the first pivot position PP1, which is firstly stored in the storage 351.

In step S6, the surgical instrument 1 is moved by the operator by operating the arm operation unit 60. Specifically, the surgical instrument 1 is moved by using at least one of the joystick 62 and linear switch 63. Alternatively, the surgical instrument 1 is moved by the operator by operating the enable switch 61 and the adjustment button 67.

In step S7, the first controller 310 determines selection from operation of the pivot button 66, reboot of the robotic surgical system 500 and detachment of the surgical instrument 1, and the procedure goes to next step.

If the pivot button 66 is operated in the pivot change mode of step S7, the second controller 350 stores a position after the surgical instrument 1 is moved as the second pivot position PP2 into the storage 351 in step S8.

If the surgical instrument 1 is detached from the patient P in the pivot change mode of step S7, the second controller 350 stores a position at which the surgical instrument 1 is detached from the patient P as the pivot position PP into the storage 351 in step S9, If the robotic surgical system 500 is rebooted in the pivot change mode of step S7, the second controller 350 stores a position of the surgical instrument 1 at the point in time in which the robotic surgical system 500 is turned OFF as the temporary pivot point PP into the storage 351 in step S10.

Subsequently, when the robotic surgical system 500 is turned ON, the first controller 310 displays a note that urges the operator to correct the pivot position PP on the monitor 140 in step S11. After that, the procedure returns to step S3.

If no in step S4, the vision unit 300 directs the monitor 140 and the display 220 to superimpose the graphical user interface G including the correctable range indication GR3 indicating the pivot correctable range A1 that is specified based on the pivot position PP that is stored in the storage 351 on the image, which is captured by the endoscope 3 as shown in FIG. 32 in step S21.

In step S22, the second controller 350 returns the pivot position PP that is stored in the storage 351 after the changing of the pivot position to the pivot position PP before the changing of the pivot position in response to the operating input for returning accepted by operating the enable switch 61 and the adjustment button 67.

In step S23, the first controller 310 determines selection from operation of the pivot button 66, reboot of the robotic surgical system 500 and attachment of the surgical instrument 1, and the procedure goes to next step.

If the surgical instrument 1 is attached to the robot arm 50 in the pivot change mode of step S23, the second controller 350 stores a position at which the surgical instrument 1 is attached to the robot arm 50 as the pivot position PP into the storage 351 in step S25, Processes in steps S24, S26 and S27 are similar to step S8, S10 and S11 operation, respectively.

Advantages of the Embodiment

The vision unit 300 is configured to direct the monitor 140 and the display 220 to superimpose the graphical user interface G including the correctable range indication GR3 indicating the pivot correctable range A1 that is specified based on the pivot position PP that is stored in the storage 351 on the image GR21, which is captured by the endoscope 3. Because a correctable range indication GR3 indicating a pivot correctable range A1 is displayed on the monitor 140 and the display 220, an operator can view the monitor 140 and the display 220 and easily recognize the pivot correctable range A1 of the pivot position PP. Also, because the pivot correctable range A1 is superimposed on the image GR21 captured by the endoscope 3 and displayed on the monitor 140, the operator can change the pivot position PP while viewing the image GR21 captured by the endoscope 3. As a result, it is possible to make work easier in space close to a surface S of a body of a patient P during surgery, and in a case in which the pivot position PP is changed to release a pull of the abdominal wall of the patient P by a trocar T when the body of the patient P is moved, the operator can easily recognize the correctable range of the pivot position PP. Also, in a case in which the pivot position PP is changed to avoid interference of robot arms 50 with each other or to increase a movable range of the surgical instrument 1 in the body of the patient P, the operator can easily recognize the correctable range of the pivot position PP.

The first controller 310 is configured to change into the pivot position change mode of changing the pivot position PP when the pivot button 66 is operated, and to direct the monitor 140 and the display 220 to superimpose the graphical user interface G including the correctable range indication GR3 on the image GR21, which is captured by the endoscope 3. Accordingly, the user can easily change the mode into the pivot position change mode of changing the pivot position PP by operating the pivot button 66, and can easily recognize the pivot correctable range of the pivot position PP in the pivot position change mode by viewing the monitor 140 and the display 220.

The correctable range indication GR3 includes the first correctable range indication GR3a indicating the pivot correctable range A1 in a plane orthogonal to the shaft 1c of the surgical instrument 1. Accordingly, the user can easily recognize the pivot correctable range A1 in a plane orthogonal to the shaft 1c of the surgical instrument 1.

The pivot correctable range A1 is represented by a sphere that centers at the pivot position PP, and the first correctable range indication GR3a includes a first circle CL1 representing the pivot correctable range A1 in a plane orthogonal to the shaft 1c of the surgical instrument 1. Accordingly, the user can intuitively recognize the pivot correctable range A1 by viewing the first circle CL1.

The diameter R1 of the first circle CL1 varies in accordance with the pivot position PP in a direction along the shaft 1c of the surgical instrument 1 during the changing of the pivot position. Accordingly, the user can intuitively recognize the pivot correctable range A1 varying according to the pivot position PP during the changing of the pivot position.

The first correctable range indication GR3a includes a second circle CL2 that represents the largest area of the pivot correctable range A1, and has a fixed diameter r1 irrespective of the pivot position PP in the direction along the shaft 1c during the changing of the pivot position. Accordingly, the user can easily recognize a relationship between the largest area of the pivot corrector range A1 and the pivot correctable range A1 varying according to the pivot position PP during the changing of the pivot position.

An indication form of the second circle CL2 when the surgical instrument 1 is attached to the robot arm 50 is different from an indication form of the second circle CL2 when the surgical instrument 1 is not attached to the robot arm 50. Accordingly, the operator can easily recognize whether the surgical instrument 1 is attached to the robot arm 50 by seeing a type of indication form of the second circular CL2.

The correctable range indication GR3 includes a linear second correctable range indication GR3b indicating the pivot correctable range A1 in the direction along the shaft 1c of the surgical instrument 1. Accordingly, the operator can easily recognize the pivot correctable range A1 in the direction along the shaft 1c of the surgical instrument 1 by seeing the linear second correctable range indication GR3b.

The vision unit 300 is configured to direct the monitor 140 and display 220 to display the image GR21, which is captured by the endoscope 3, with the graphical user interface G including a first changing-position indication GR4a that indicates a pivot position PP in a plane orthogonal to the shaft 1c of the surgical instrument 1 during the changing of the pivot position, and a second changing-position indication GR4b that indicates the pivot position PP in a direction along the shaft 1c. Accordingly, the operator can easily recognize the pivot position PP during the changing of the pivot position by seeing the first changing-position indication GR4a and the second changing-position indication GR4b.

Indication forms of the first and second changing-position indications GR4a and GR4b in a case in which the enable switch 61 enables the movement of the robot arm 50 are different from indication forms of the first and second changing-position indications GR4a and GR4b in a case in which the enable switch 61 disables the movement of the robot arm 50. Accordingly, the operator can easily recognize whether the movement of the robot arm 50 is enabled or disabled by seeing a type of indication forms of the first changing-position indication GR4a and the second changing-position indication GR4b.

The vision unit 300 is configured to direct the monitor 140 and the display 220 to superimpose the graphical user interface G including the correctable range indication GR3 corresponding to one robot arm 50 during the changing of the pivot position PP in the robot arm 50a, 50b, 50c and 50d on the image GR21, which is captured by the endoscope 3. Accordingly, because only the correctable range indication GR3 of the robot arm 50 during the changing of the pivot position PP is indicated, the operator can easily recognize which robot arm 50 is the robot arm 50 during the changing of the pivot position PP.

The vision unit 300 is configured to direct the monitor 140 and the display 220 to display the image GR21, which is captured by the endoscope 3, with the graphical user interface G including a pivot-to-pivot distance indication GR5 indicating distances between pivot positions PP that are pivot points of movement of the surgical instruments 1 attached to the robot arms 50a, 50b, 50c and 50d superimposed on the image. Accordingly, the operator can easily recognize the distance between the pivot positions PP by seeing the pivot-to-pivot distance indication GR5.

The vision unit 300 directs the monitor 140 and the display 220 to superimpose the graphical user interface G including the correctable range indications GR3 corresponding to the robot arms 50a, 50b, 50c and 50d on the image GR21, which is captured by the endoscope 3 if the switch 131 accepts an operating input for displaying the pivot-to-pivot distance indication GR5 on the monitor 140 and the display 220. Accordingly, the operator can easily recognize correctable range indications GR3 of all the robot arm 50a, 50b, 50c and 50d by operating the switch 131.

The vision unit 300 is configured to return the pivot position PP that is stored in the storage 351 after the changing of the pivot position to the pivot position PP before the changing of the pivot position in response to the operating input for returning accepted by operating the enable switch 61 and the adjustment button 67. Accordingly, if desiring to return the pivot position PP after the changing of the pivot position to the pivot position PP before the changing of the pivot position, the operator can easily return the pivot position PP after the changing of the pivot position to the pivot position PP before the changing of the pivot position by operating the enable switch 61 and the adjustment button 67.

Modified Embodiments

Note that the embodiment disclosed this time must be considered as illustrative in all points and not restrictive. The scope of the present invention is not shown by the above description of the embodiments but by the scope of claims for patent, and all modifications or modified examples within the meaning and scope equivalent to the scope of claims for patent are further included.

While the example in which the vision unit 300 is configured to direct the monitor 140 and the display 220 to display the correctable range indication GR3 in the pivot position change mode has been shown in the aforementioned embodiment, the present disclosure is not limited to this. For example, the vision unit 300 may be configured to direct the monitor 140 and the display 220 to display the correctable range indication GR3 in a time period other than the pivot position change mode.

While the example in which the pivot correctable range A1 in a plane orthogonal to the shaft 1*c* of the surgical instrument 1 is represented by the first circle CL1 has been shown in the aforementioned embodiment, the present disclosure is not limited to this. For example, the pivot correctable range A1 may be represented by one other shape other than such a circle.

In the above embodiment, the first correctable range indication GR3*a* includes both the first circle CL1 and the second circle CL2 has been shown in the aforementioned embodiment, the present disclosure is not limited to this. For example, the first correctable range indication GR3*a* may include only the first circle CL1.

While the example in which the second circle CL2 when the surgical instrument 1 is attached to the robot arm 50 is indicated by a solid line, and the second circle CL2 when the surgical instrument 1 is not attached to the robot arm 50 is indicated by a dotted line has been shown in the aforementioned embodiment, the present disclosure is not limited to this. For example, text may indicate whether the surgical instrument 1 is attached to the robot arm 50 or not.

While the example in which indication forms of the first and second changing-position indications GR4*a* and GR4*b* in a case in which the enable switch 61 enables the movement of the robot arm 50 are different in color from indication forms of the first and second changing-position indications GR4*a* and GR4*b* in a case in which the enable switch disables the movement of the robot arm has been shown in the aforementioned embodiment, the present disclosure is not limited to this. For example, indication forms of the first and second changing-position indications GR4*a* and GR4*b* in a case in which the enable switch 61 enables the movement of the robot arm 50 may be different in shape from indication forms in a case in which the enable switch disables the movement of the robot arm.

While the example in which the vision unit 300 is configured to direct the monitor 140 and the display 220 to display the correctable range indication GR3 corresponding to the robot arm 50 during changing of the pivot position has been shown in the aforementioned embodiment, the present disclosure is not limited to this. For example, the vision unit 300 may be configured to direct the monitor 140 and the display 220 to display the correctable range indications GR3 corresponding to the robot arms 50 that are not subjected changing of the pivot position.

While the example in which the correctable range indication GR3 is indicated below the pivot-to-pivot distance indication GR5 on the monitor 140 and the display 220 has been shown in the aforementioned embodiment, the present disclosure is not limited to this. For example, the correctable range indication GR3 may be indicated above the pivot-to-pivot distance indication GR5.

While the example in which four robot arms 50 are provided has been shown in the aforementioned embodiment, the present disclosure is not limited to this. In the present disclosure, any number of robot arms 50 may be provided as long as at least one robot arms are provided.

While the example in which the arms 51 and the positioner 30 are constructed of a 7-axis multi-joint robot has been shown in the aforementioned embodiment, the present disclosure is not limited to this. For example, the arms 51 and the positioner 30 are constructed of a multi-joint robot having an axis configuration other than the 7-axis multi-joint robot. The multi-joint robot having an axis configuration other than the 7-axis multi-joint robot can be a 6-axis or 8-axis multi-joint robot, for example.

While the example in which the surgical robot 100 includes the medical cart 10, the positioner 30 and the arm base 40 has been shown in the aforementioned embodiment, the present disclosure is not limited to this. The medical cart 10, the positioner 30 and the arm base 40 are not necessarily provides, and the surgical robot 100 may include only the robot arms 50, for example.

Functions of elements disclosed in this specification can be realized by a circuit or processing circuit including a general-purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or may be other known hardware programed or configured to realize the functions stated above. Where hardware is a processor considered to be a type of circuit, the circuit, means or unit is a combination of hardware and software, and the software is used to configure the hardware and/or processor.

What is claimed is:

1. A robotic surgical system comprising:
    a robot arm including a distal part to which a surgical instrument is attached;
    a pivot position specifier configured to store a pivot position in a storage, wherein the pivot position is a pivot point of movement of the surgical instrument which is attached to the robot arm;
    a display configured to display an image that is captured by an endoscope; and
    a controller configured to display, on the display, a graphical user interface overlayed on the image captured by the endoscope, wherein the graphical user interface includes a correctable range indication indicating a pivot correctable range that is set based on the pivot position stored in the storage.

2. The robotic surgical system according to claim 1, wherein
    the controller is configured to execute transition to a pivot position change mode of changing the pivot position in accordance with an operating input accepted by the pivot position specifier, and display, on the display, the graphical user interface including the correctable range indication overlayed on the image captured by the endoscope.

3. The robotic surgical system according to claim 1, wherein the surgical instrument includes a shaft; and the correctable range indication includes a first correctable range indication indicating the pivot correctable range in a plane orthogonal to the shaft of the surgical instrument.

4. The robotic surgical system according to claim 3, wherein the pivot correctable range is represented by a sphere that centers at the pivot position; and the first correctable range indication includes a first circle indicating the pivot correctable range in the plane orthogonal to the shaft of the surgical instrument.

5. The robotic surgical system according to claim 4, wherein a diameter of the first circle varies in accordance with the pivot position in a direction along the shaft of the surgical instrument during changing of the pivot position.

6. The robotic surgical system according to claim 4 wherein the first correctable range indication includes a second circle that represents the largest area of the pivot correctable range, and has a fixed diameter irrespective of the pivot position in the direction along the shaft during changing of the pivot position.

7. The robotic surgical system according to claim 6, wherein an indication form of the second circle in a case in which the surgical instrument is attached to the robot arm is different from an indication form of the second circle in a case in which no surgical instrument is attached to the robot arm.

8. The robotic surgical system according to claim 3, wherein the correctable range indication includes a linear second correctable range indication indicating the pivot correctable range in a direction along the shaft of the surgical instrument.

9. The robotic surgical system according to claim 1, wherein the surgical instrument includes a shaft; and the controller is configured to display the graphical user interface including a first changing-position indication that indicates a pivot position in the plane orthogonal to the shaft of the surgical instrument during changing of the pivot position, and a second changing-position indication that indicates the pivot position in the direction along the shaft.

10. The robotic surgical system according to claim 9 further comprising an enable switch configured to enable or disable the movement of the robot arm, wherein indication forms of the first and second changing-position indications in a case in which the enable switch enables the movement of the robot arm are different from indication forms of the first and second changing-position indications in a case in which the enable switch disables the movement of the robot arm.

11. The robotic surgical system according to claim 1 further comprising a second robot arm, wherein when the pivot position of the second robot arm is changed, the controller is configured to display the graphical user interface including the correctable range indication corresponding to the second robot arm.

12. The robotic surgical system according to claim 1 further comprising a second robot arm, wherein the controller is configured to display the graphical user interface including a pivot-to-pivot distance indication indicating a distance between pivot positions that are pivot points of movement of the surgical instruments attached to the robot arm and the second robot arm.

13. The robotic surgical system according to claim 12 further comprising a switch configured to accept selection whether the pivot-to-pivot distance indication is displayed on the display, wherein the controller is configured to display, in a case in which the switch is selected to display the pivot-to-pivot distance indication on the display, the graphical user interface including the correctable range indications corresponding to the robot arm and the second robot arm.

14. The robotic surgical system according to claim 1 further comprising a pivot position returner configured to accept an operating input for returning the pivot position that has been changed to the pivot position before changing of the pivot position, wherein the controller is configured to execute returning the pivot position that is stored in the storage after the changing of the pivot position to the pivot position before the changing of the pivot position in response to the operating input for returning accepted by the pivot position returner.

15. A method for controlling a robotic surgical system comprising:

storing a pivot position that is a pivot point of movement of a surgical instrument that is attached to a robot arm in a storage in accordance with an operating input accepted by a pivot position specifier; and displaying, on a display, a graphical user interface overlayed on an image captured by the endoscope, wherein the graphical user interface includes a correctable range indication indicating a pivot correctable range that is set based on the pivot position stored in the storage.

16. The method for controlling a robotic surgical system according to claim 15, wherein the displaying the graphical user interface including the correctable range indication to be superimposed on the image on the display includes changing into a pivot position change mode of changing the pivot position in accordance with an operating input accepted by the pivot position specifier, and the displaying, on the display, the image with the graphical user interface including the correctable range indication overlayed on the image captured by the endoscope.

17. The method for controlling a robotic surgical system according to claim 15, wherein the surgical instrument includes a shaft; and the correctable range indication includes a first correctable range indication indicating the pivot correctable range in a plane orthogonal to the shaft of the surgical instrument.

18. The method for controlling a robotic surgical system according to claim 15, wherein the surgical instrument includes a shaft; and the method further comprises displaying the graphical user interface including the correctable range indication a first changing-position indication that indicates a pivot position in a plane orthogonal to the shaft of the surgical instrument during changing of the pivot position, a second changing-position indication that indicates the pivot position in a direction along the shaft.

19. The method for controlling a robotic surgical system according to claim 15, wherein the displaying the graphical user interface including the correctable range indication to be superimposed on the image on the display includes directing the display to display the image, when the pivot position of the second robot arm is changed, displaying the graphical user interface including the correctable range indication corresponding to the second robot arm.

20. The method for controlling a robotic surgical system according to claim 15 further comprising displaying the graphical user interface including a pivot-to-pivot distance indication indicating a distance between pivot positions that are pivot points of movement of the surgical instruments attached to the robot arm and the second robot arm.

* * * * *